US006232984B1

(12) United States Patent
Chuah et al.

(10) Patent No.: US 6,232,984 B1
(45) Date of Patent: May 15, 2001

(54) DATA VISUALIZATION SYSTEM

(75) Inventors: Mei Ching Chuah, Pittsburgh, PA (US); Stephen Gregory Eick, Naperville, IL (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 08/861,978

(22) Filed: May 22, 1997

(51) Int. Cl.[7] .................................................... G01R 13/00
(52) U.S. Cl. ............................................ 345/441; 345/440
(58) Field of Search ..................................... 345/440, 441

(56) References Cited

U.S. PATENT DOCUMENTS

| | | | | |
|---|---|---|---|---|
| 5,150,457 | * | 9/1992 | Behm et al. | 345/440 |
| 5,291,587 | * | 3/1994 | Kodosky et al. | 345/440 |
| 5,333,244 | * | 7/1994 | Harashima | 345/440 |
| 5,454,068 | * | 9/1995 | Ramanujam | 345/440 |
| 5,491,779 | * | 2/1996 | Bezjian | 345/440 |
| 5,511,158 | * | 4/1996 | Sims | 345/440 |
| 5,557,717 | * | 9/1996 | Wayner | 345/440 |
| 5,581,797 | * | 12/1996 | Baker et al. | 345/440 |
| 5,751,931 | * | 5/1998 | Cox et al. | 345/440 |

OTHER PUBLICATIONS

R.M. Pickett and G.G. Grinstein, "Iconographics Displays for Visualizing Multidimensional Data," IEEE International Conference on Systems, Man and Cybernetics: Aug. 8–12, 1988.

H. Chernoff, "The Use of Faces to Represent Points in K–Dimensional Space Graphically," Journal of the American Statistical Association, vol. 68, pp. 361–368, 1973.

* cited by examiner

*Primary Examiner*—Amare Mengistu
*Assistant Examiner*—Vincent E. Kovalick

(57) ABSTRACT

A multi-dimensional glyph for visually presenting data relating to a project comprises a plurality of component objects representing different data items, each component object having a color-coded attribute relating to the data item presented and having an attribute for encoding data item changes over time. A system for generating each glyph includes a device for representing various data items extracted from a database as display objects, and a device for arranging the display objects as a visually recognizable glyph for presenting the data items simultaneously on a graphics display, the objects of the glyph being color coded to define a type of data and having attributes for presenting changes of the data item over time. The system is interactive enabling manipulation of the glyph on the display for visualizing a developmental state of a data item at a prior point in time.

23 Claims, 19 Drawing Sheets

(5 of 19 Drawing Sheet(s) Filed in Color)

DATA VISUALIZATION SYSTEM

FIELD OF THE INVENTION

The present invention relates to glyphs for visualizing data, and more particularly, to a novel glyph and glyph generation system for enabling users to visually track issues relating to production, engineering, and project management.

BACKGROUND OF THE INVENTION

Software is a huge industry producing the most complicated data-driven systems ever created. Developing large software systems is an extremely complex, team-oriented, engineering activity. For instance, FIG. 2 illustrates general "objects" relating to a software project, and particularly, a software "release" 10, shown at the apex of a tree. A software release may be viewed from three different perspectives: a functional view 12, organizational view 14 and structural view 16. Each of these perspectives appears as a column in FIG. 2.

The functional perspective 12 views a software release based on the various capabilities it provides to customers. A set of software capabilities are collected together and packaged into a release for customers. This categorization is useful because it defines a customer delivery against which deadlines are cast. In addition, it is commonly used as an organizing factor for the development team producing the release.

The organizational perspective 14 focuses on the people involved in a software production process. The development team is usually divided into departments with each department in turn having its own hierarchy of groups and engineers. This categorization is useful for providing human links for resolving or following up on problems.

Finally, the structural perspective 16 views software artifacts including code, requirements documents, and other information kept in version management databases. At the highest level the code is divided into subsystems. Within each subsystem are modules, and within each module are source code files. A multi-million line software project may be partitioned into tens of subsystems, thousands of modules, and hundreds of thousands of files. For each file, the version management system maintains the complete history, including: a) the date and time of every change, b) lines affected, c) reason for the change, d) functionality added by the change for code additions, e) the fault repaired for error correcting code, and f) the like.

Databases associated with software projects are a rich, under-utilized resource for understanding software production. Large databases associated with a large software production project, however, make data unfeasible to read textually and its lack of structure frustrates statistical analysis tools. The challenge exists to extract information from the databases and present it to software engineers and managers in a useful and actionable form.

Thus, a need exists for a way to visually represent abstract project-management data, and, particularly, to abstract data related to software production, e.g., data relating to the overall task of efficiently managing and processing resources, both human and machine, for a software project. By making the information related to software visible, software engineers may cope with the complexity inherent in, and project managers may better understand, the software process. This should improve productivity in the software production process.

Over the last several years many techniques and systems have appeared for visualizing algorithms, code text, and other information associated with software data. Much of this research has focused on improving individual programmer productivity and has not been directed to visualizing software data associated with team productivity, i.e., project management. In large scale systems with thousands of programmers, the team-oriented aspects of the process and management decisions dominate the effects of individuals, no matter how talented and productive individuals are.

One prior art method of viewing multi-dimensional objects is through linked scatterplots, such as described in R. A. Becker and W. S. Cleveland, "Brushing Scatterplots," Technometrics, Vol. 29, 1987, pp. 127–142. However, this method does not enable the properties of a data element corresponding to a "real world" entity, e.g., a source code file or a person, to be grouped together visually.

Another prior art method for presenting multi-dimensional data is to employ visual metaphors embodied in glyphs, for example, as described in H. Chernoff, "The Use of Faces to Represent Points in k-Dimensional Space Graphically", *Journal of the American Statistical Association,* 1973, pp. 957–968 and, in the reference "Iconographic Displays for Visualizing Multidimensional Data," *Proceedings I.E.E.E. Conference on systems, Man, and Cybernetics,* 1988, pp. 514–519, by R. M. Pickett and G. Grinstein. However, the glyphs taught in these references focus on encoded attributes of discrete data, are non-color, and do not facilitate presentation of complex software data or project management data.

SUMMARY OF THE INVENTION

The present invention is a data visualization system for visually displaying large amounts of data, e.g., related to a software project, accumulated over a period of time. Particularly, the system generates a useful visualization glyph enabling the effective presentation of software data. In accordance with the principles of the invention, the visualization glyph is multi-dimensional and includes at least two component objects that each represent different ones of respective software data items. Each component object has a color-coded attribute that relates to the data item it represents, with each color-coded attribute configured to represent how a data item changes over time. Additionally, the system is interactive, enabling a user to manipulate the software visualization glyph to display user-selected software data information up to and including any user specified prior point in time.

Advantageously, the system enables the effective presentation of project management data in general, and specifically, data relating to a software release.

In one embodiment of the invention, the visualization system includes a database, a device for extracting various data items from the database and representing the data items as display objects that together form a visually recognizable glyph when displayed simultaneously on a graphics display. The objects of the glyph are color coded to define a type of data, and they have attributes for presenting changes over time in the data item they represent. The system is interactive and enables one type of visually recognizable glyph to be manipulated on the display screen to display the data item at a prior point in time.

The system of the invention additionally enables clustering of one or more glyphs on the display so as to enable comparison of data item trends over a period of time. Doing so may help determine the source of problems relating to a particular project.

BRIEF DESCRIPTION OF DRAWINGS

The file of this patent contains at least one drawing executed in color. Copies of this patent with color drawings will be provided by the Patent and Trademark Office upon request and payment of the necessary fee.

FIGS. 5(*a*)–5(*d*) illustrate the decomposition of the software glyph of the first embodiment of the invention.

FIG. 11(*b*) illustrates a different perspective of each of the four glyphs of the third embodiment for the four example developers third embodiment as displayed in FIG. 11(*a*).

FIG. 11(*c*) illustrates each of the four glyphs of the first embodiment for the four example developers as displayed in FIG. 11(*a*).

DETAILED DESCRIPTION OF THE INVENTION

Figure 1:
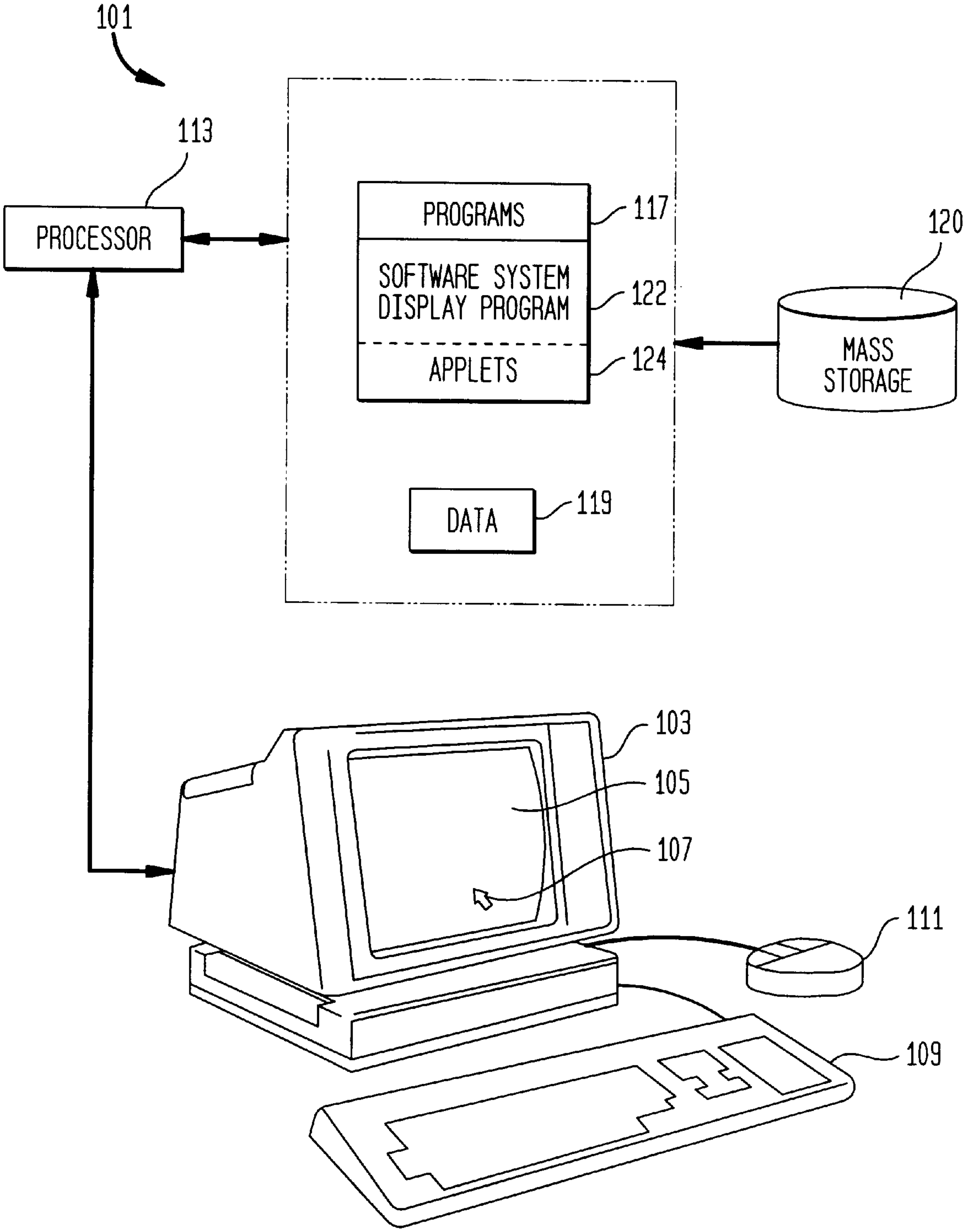
FIG. 1 is a block diagram illustrating an example computer system for displaying the software visualization glyphs of the invention.

Referring now to FIG. 1, a computer system 101 is illustrated in this block diagram. The computer system 101 includes terminal 103, which provides output to and receives input from technical personnel operating the computer system 101, processor 113, which performs the actual operations, memory 115, which contains programs 117 executed by processor 113, and data 119, which contains software statistical data. Computer system 101 also has mass storage unit 120 for storing large programs and large quantities of data. In more detail, terminal 103 includes a display screen 105, upon which processor 113 displays information for the operator. Display screen 105 also includes pointer 107, which specifies a location in display 105 and may be moved under control of either keyboard 109 or mouse 111. The operator controls the operation of computer system 101 by inputs from keyboard 109 and/or mouse 111. Processor 113 may be any kind of processor, e.g., from a microcontroller through a super-computer. Memory 115 may include random-access memory and read only memory for program and data storage. Mass storage unit 120 may include a magnetic disk, an optical disk, or even a remotely-located data base.

Programs 117 are widely used Internet browser programs such as Netscape Navigator® (trademark of Netscape Inc.) and Internet Explorer® (trademark of Microsoft, Inc.). The software system display program is provided with one or more applets 124 for generating each of three software glyphs of the invention and further applets for generating scatter-plot displays of the software system hierarchy and for generating a time-line for each software visualization glyph. The software glyphs described herein are preferably built using a computer language, such as, e.g., Java® (trademark of Sun Microsystems) that can be interpreted by, e.g., the Navigator®. The three-dimensional software visualization glyph may be generated by a VRML (Virtual Reality Markup Language).

Figure 2:
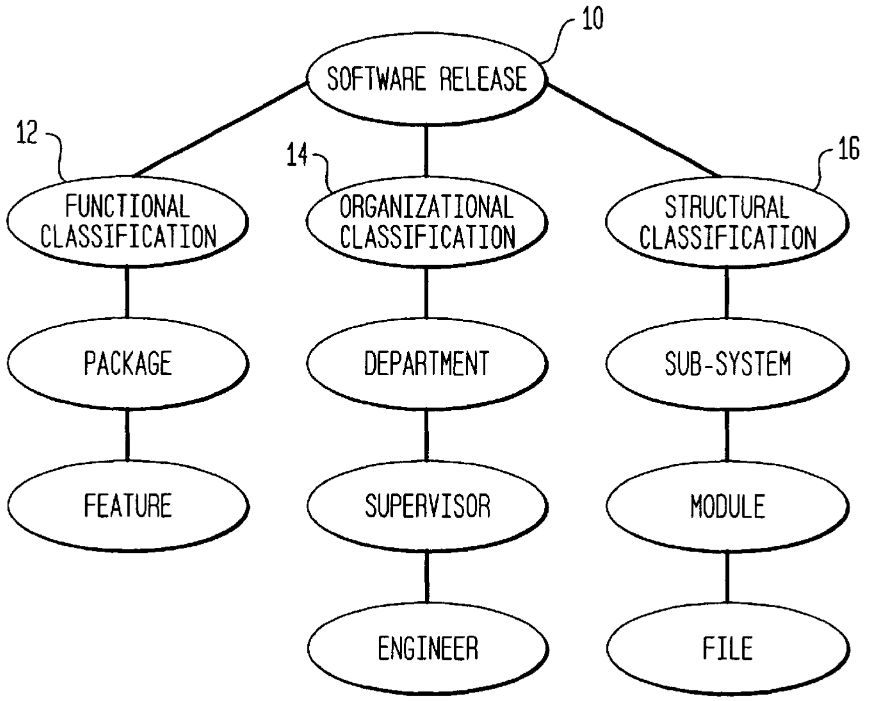
FIG. 2 illustrates objects relating to a software project.
Figure 3:
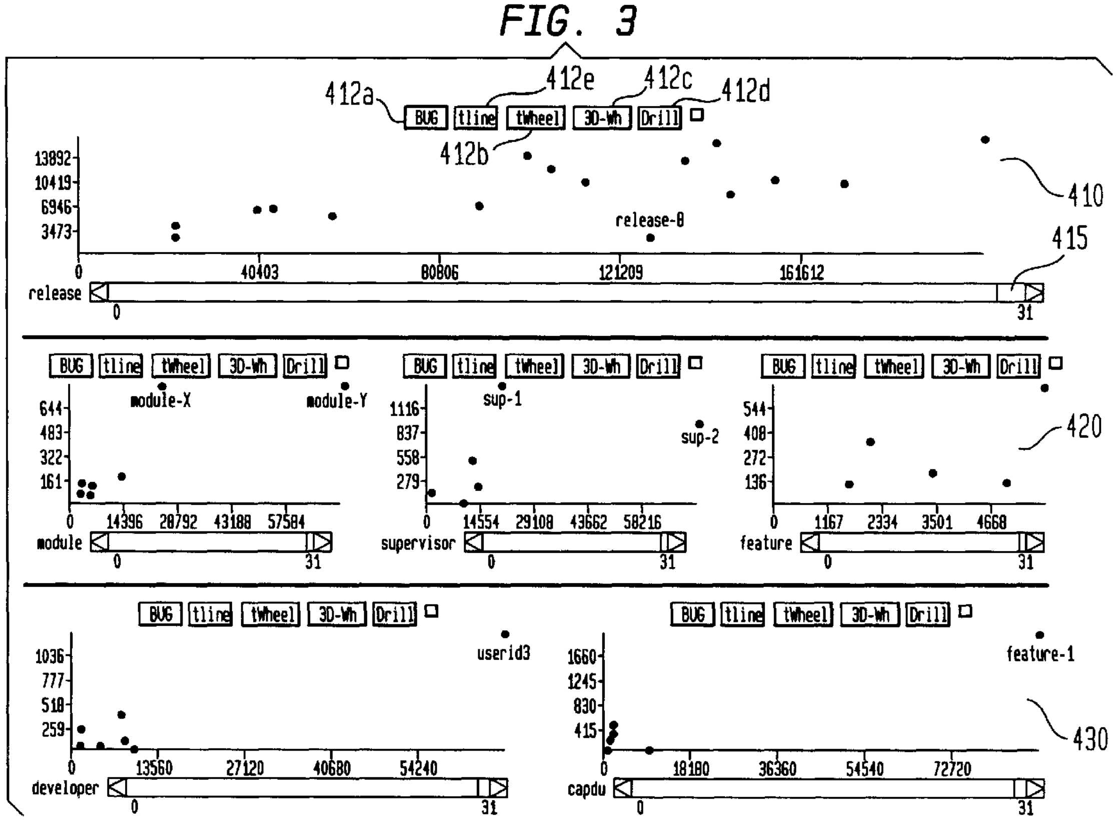
FIG. 3 is an illustrative example of a hierarchy of scatter-plots.
Figure 4A:
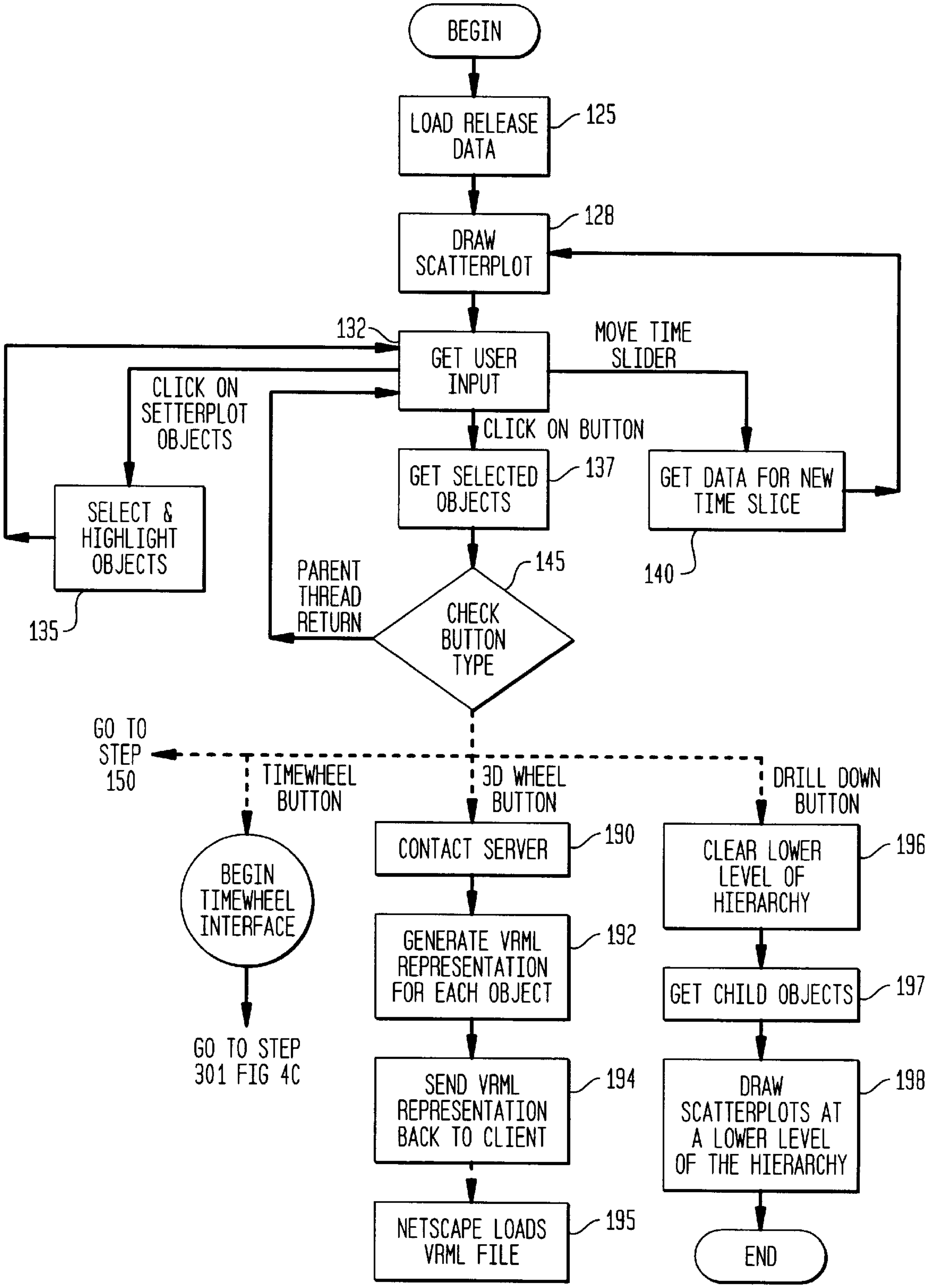
FIGS. 4(*a*) and 4(*b*) are state flow diagrams depicting the interactive software glyph generation system.
Figure 4B:
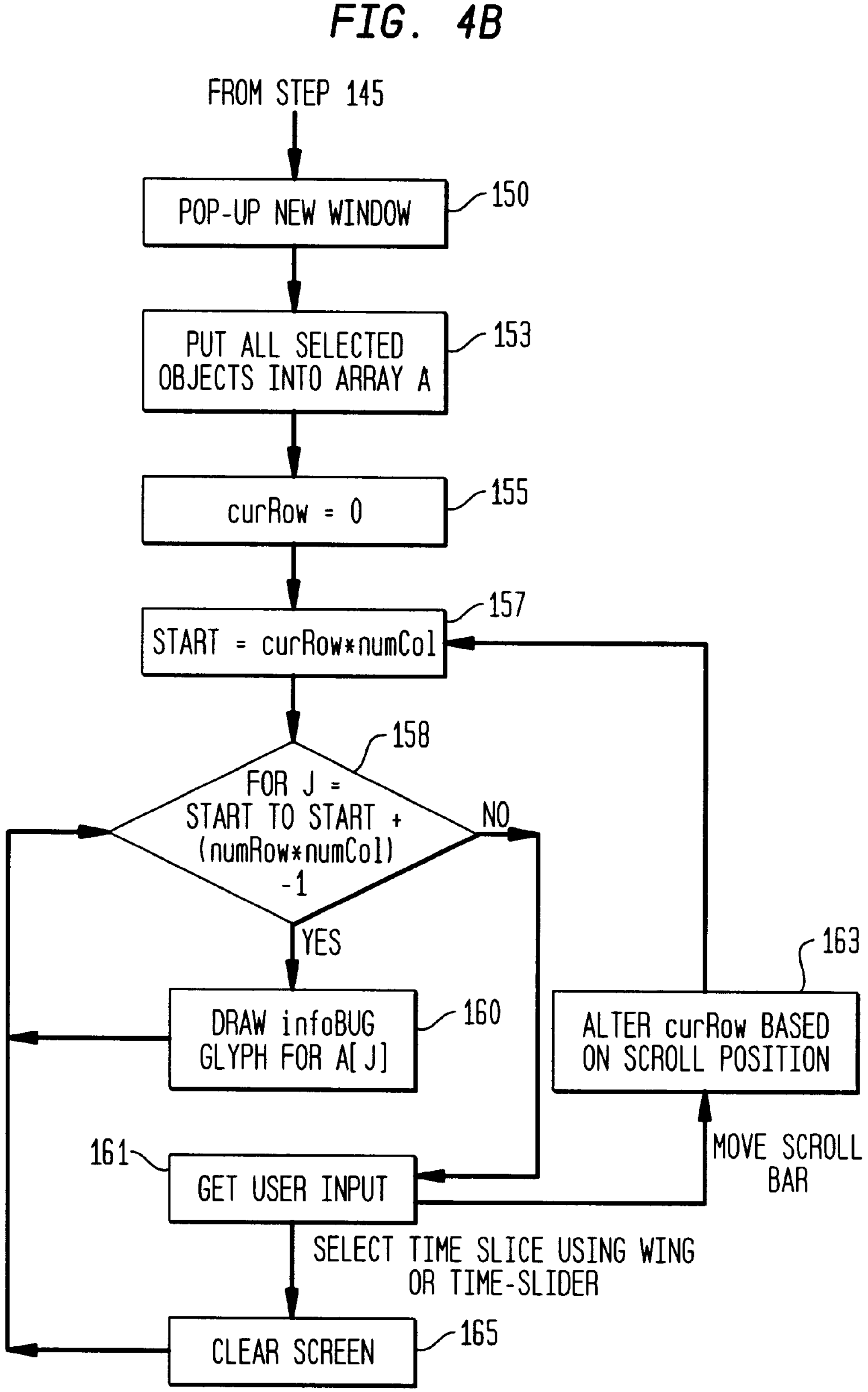
Figure 4C:
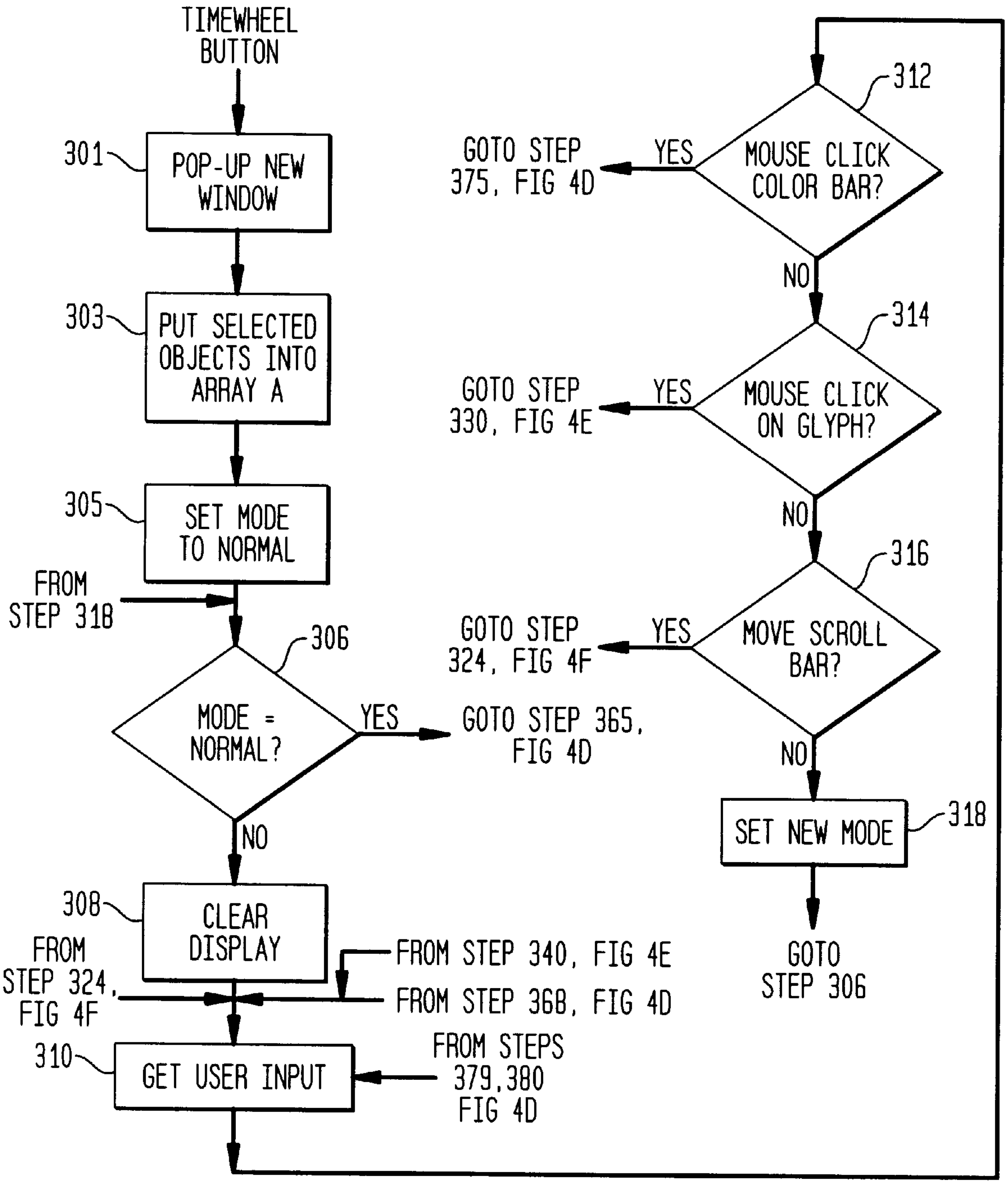
Figure 4D:
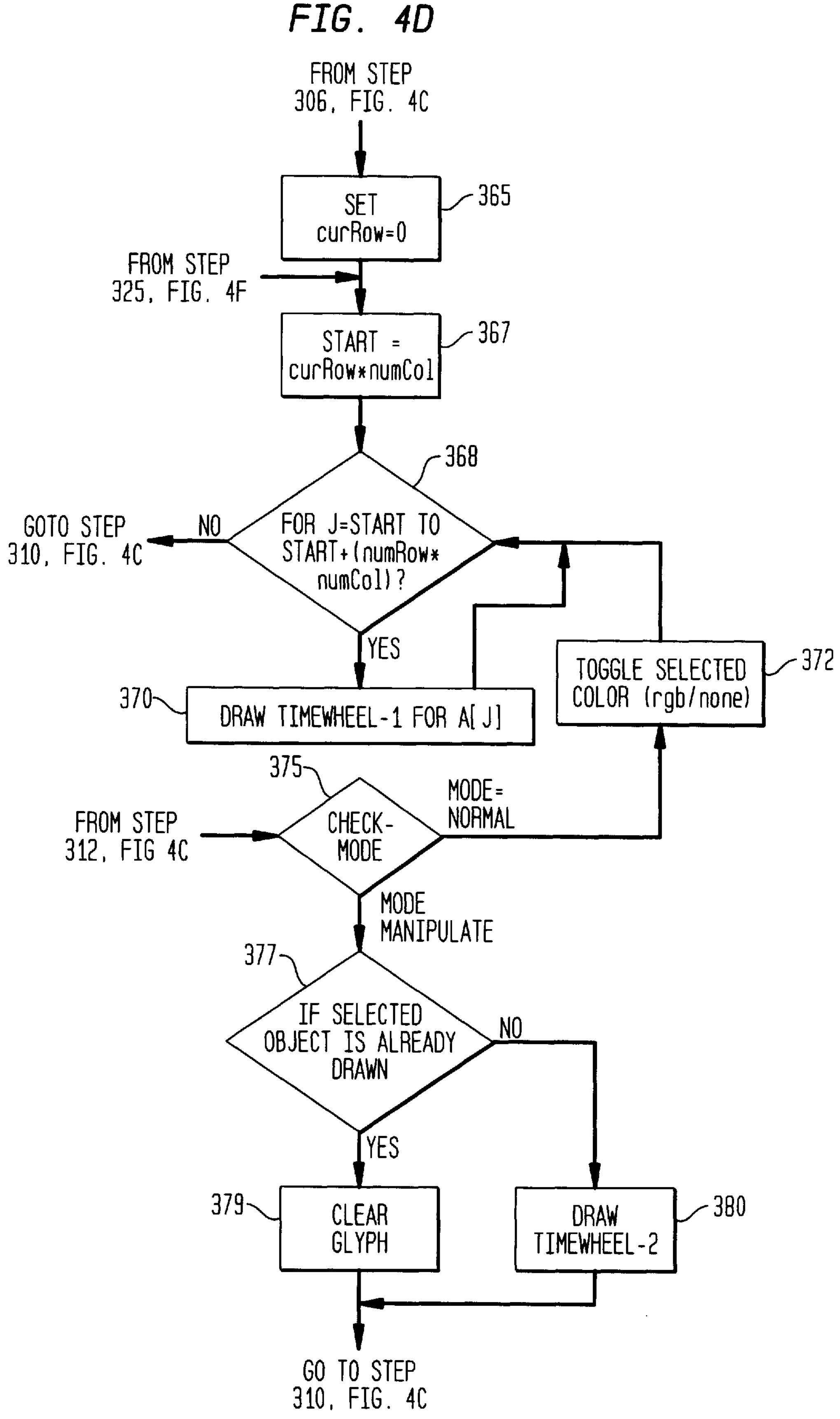
Figure 4F:
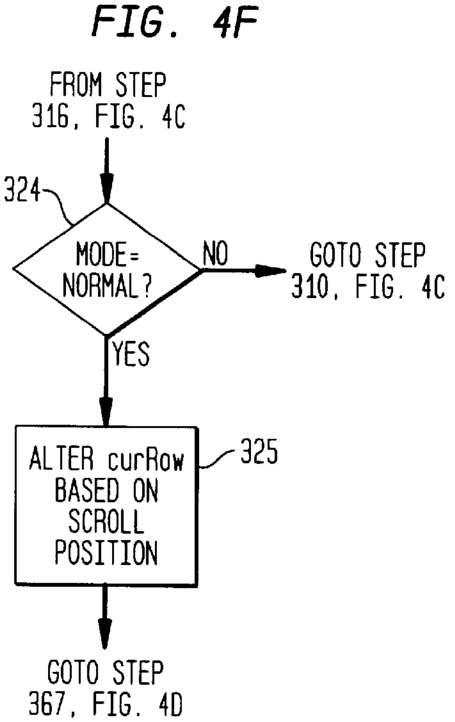
Figure 4E:
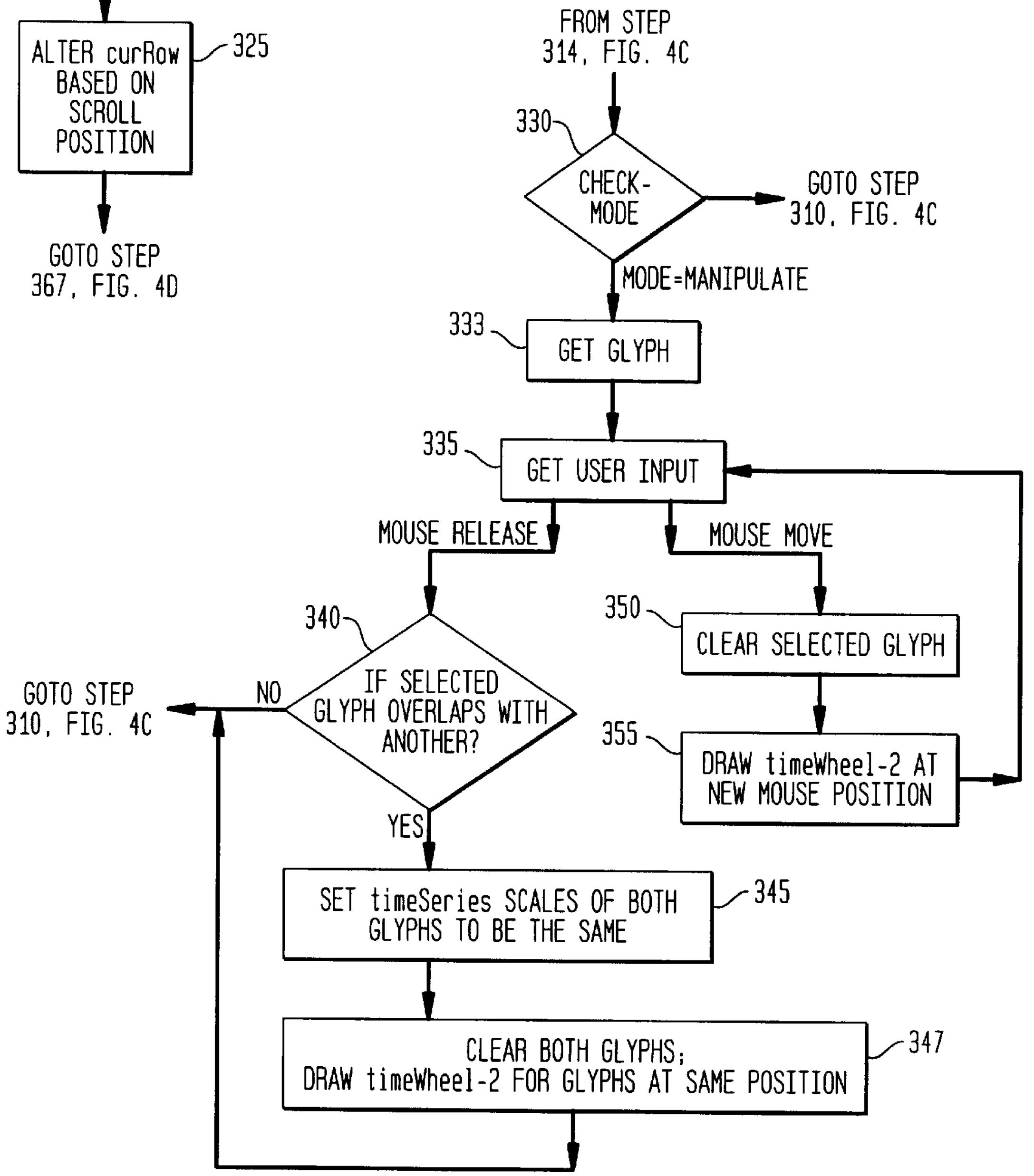

FIGS. 4(*a*) and 4(*b*) are state flow diagrams illustrating the system for generating each of three interactive software glyphs of the invention. As shown at step 125 of FIG. 4(*a*), the relevant data relating to each release of the software is loaded into the system in a form suitable for use by the Java applets 124. As within the purview of skilled artisans, the relevant data has been extracted and summarized during a pre-processing step (not shown). As mentioned above, the software data relates to the functional, organizational, and structural aspects of software production depicted in FIG. 2. Then, at step 128, the system implements a known process that can integrate the software data and generates a sequence of scatter plots or hierarchical diagrams of the software releases as shown in FIG. 3. The hierarchical sequence of tiled scatter plots are based on the software hierarchy as shown in FIG. 2 and are labeled 410, 420 and 430 in FIG. 3.

Referring back to FIG. 4(*a*), the user is then prompted at step 132 to take action in the form of inputting data. As indicated at step 135, this involves selecting or highlighting scatterplot objects, e.g., software release numbers, by clicking each with the mouse 111 and inputting the selected objects as indicated at step 137. As shown in the example scatterplot display of FIG. 3, "release-8" is highlighted as the displayed object. If the user desires, the scatterplot may be altered at step 140 to generate objects relevant to a selected point in time. To accomplish this, an interactive time-slider 415 is provided which may be clicked by the user so that data relating to a software release object at any selected point in time may be retrieved. After selection of the time, the scatterplot is re-drawn at step 128 to reflect the chosen time base.

As shown at step 145 in FIG. 4(*a*), after retrieving the selected objects, e.g., software releases, the process waits for the user to select the software glyph for visualizing the retrieved data. As will be explained hereinbelow, three software glyphs are available for display: "InfoBUG" glyph

Figure 5:
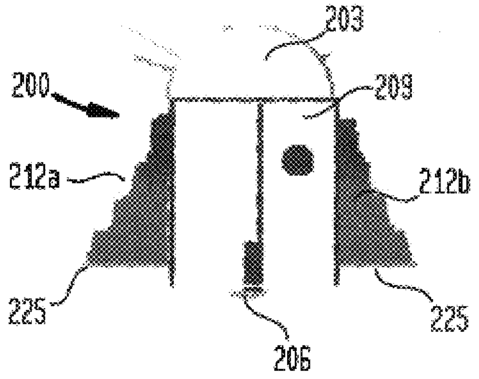
FIG. 5 illustrates the software glyph of the first embodiment of the invention.
Figure 5A:
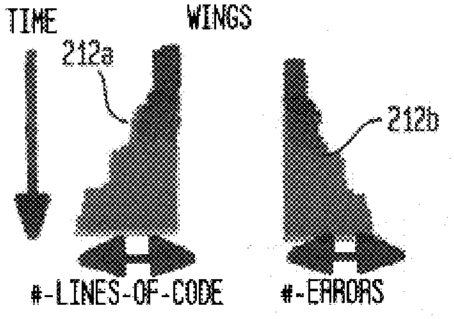
Figure 5B:
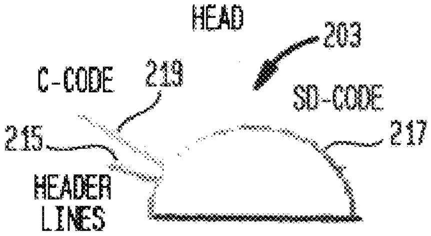
Figure 5C:
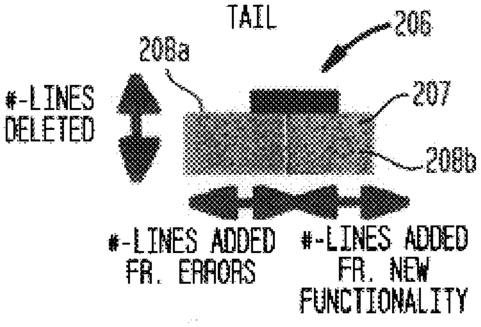
Figure 5D:
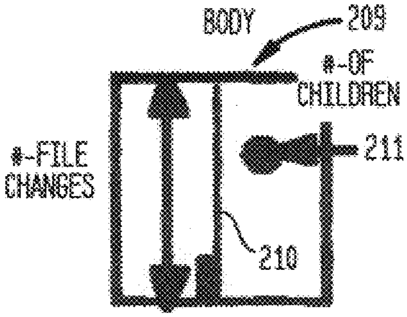
Figure 7:
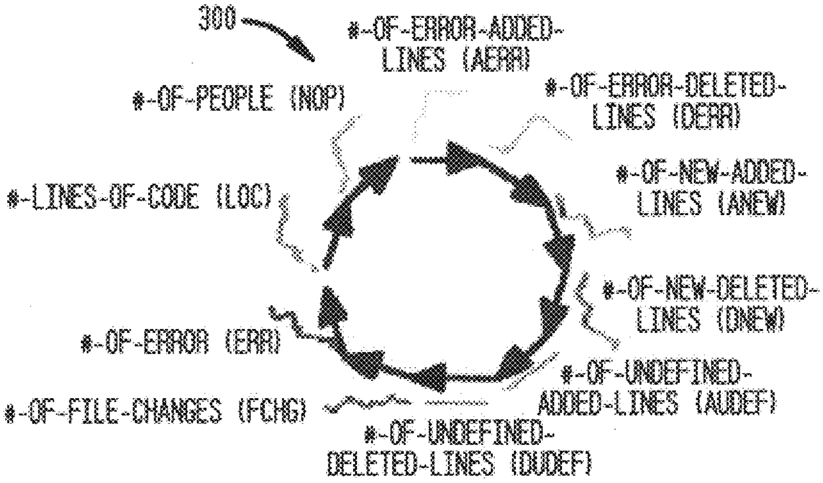
FIG. 7 illustrates the software glyph of the second embodiment of the invention.
Figure 10:
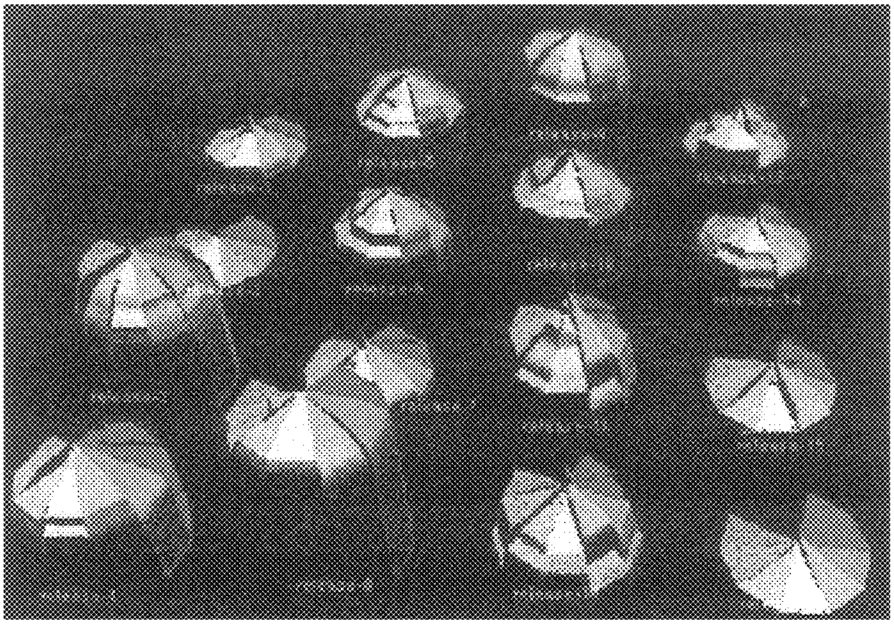
FIG. 10 illustrates the user interface displaying the same sixteen hypothetical software releases of FIGS. 6 and 8 as represented by a glyph of the third embodiment.

200, shown in FIG. 5, "Time-Wheel" glyph 300, shown in FIG. 7, and "3D-Wheel" glyph 400, shown in FIG. 10. In accordance with aspects of the invention, the high-level scatterplot 410 of FIG. 3 illustrates three interactive buttons 412*a,* 412*b,* and 412*c* relating to each respective software glyph that may be selected by the user. User selection of one of these glyph buttons will enable the display of the corresponding software glyph for the selected software items. For instance, as shown in FIG. 4(*a*), if the infoBUG glyph button 412*a* was chosen, the system proceeds as indicated in FIG. 4(*b*).

To generate the infoBUG glyph, as shown at step 150 in FIG. 4(*b*), a new window is first displayed on the user graphics screen. Next, at step 153, all of the selected objects to be represented in the software glyph are acquired and placed in a software construct, e.g., an array A[j], where "j" is the index of all the selected objects. Thus, array A would look like A[0]=release-0, A[1]=release-1, etc.

It should be understood that if there are many software releases, there may not be enough room on the display screen to view all of the corresponding glyphs simultaneously. As the display screen may be viewed as a grid of rows and columns, for purposes of display, the system defaults to include the first selected software release, e.g., A[1] at a predetermined location, e.g., at row=1, col.=1 on the screen. At step 155 in FIG. 4(*b*), the current row variable "curRow", indicating the row where the first software object is to be displayed on the display screen, is initialized to zero. Then, at step 157, the variable "start" is assigned an index value that is a function of both the "curRow" value of the software object to be displayed and the total number of columns "numCol", available in the screen area, i.e., start=(curRow*numCol). For example, in an object glyph screen display area, "numCol" may equal two (2) indicating that only two columns are available. Likewise, a value of the total number of available rows, "numRows", in the object glyph display area may, for exemplary purposes, also be two (2), thus indicating a total of four glyphs that can be displayed at a time. However, it may be the case that there are sixteen software releases, A[0]–A[15], meaning that there are eight possible rows that may be drawn (since there are only two columns). To display the selected objects, a loop is entered at steps 158 and 160 for rendering infoBUG glyphs at successive screen locations for each selected software object, with each object in the array pointed to by the index "j" which has an initial value equal to start and which is incremented by one until the index j=start+(numRow*numCol)−1. Specifically, at step 160, in the manner as explained herein, the infoBUG glyph is drawn for selected objects A[j] in the array at locations beginning at the "start" location (e.g., 1,1) and each incremented location therefrom in accordance with step 158. In the example provided, selected objects at array locations A[0]–A[3] will be drawn.

When there are no more objects to be displayed, the process continues at step 161 and waits for any user input. If the user decides to view releases A[10]–A[13] corresponding to software releases 10–13, for example, the user manipulates the scroll bar 251 of the object glyph display screen (shown in FIG. 6) to point to that desired row, e.g., row 5. In doing so, at step 163, the "curRow" value is changed to 5 corresponding to the fifth row. Consequently, the system returns to step 157, where the start variable is amended to the new starting object value ten (10), i.e., curRow*numCol (=5×2). Thus, index j will have a value 10, and the process for generating the new glyphs A[10]–A[13] is repeated at steps 158–160 by incrementing array index value j at each iteration from start to start+(numCol*numRow)−1.

Figure 6:
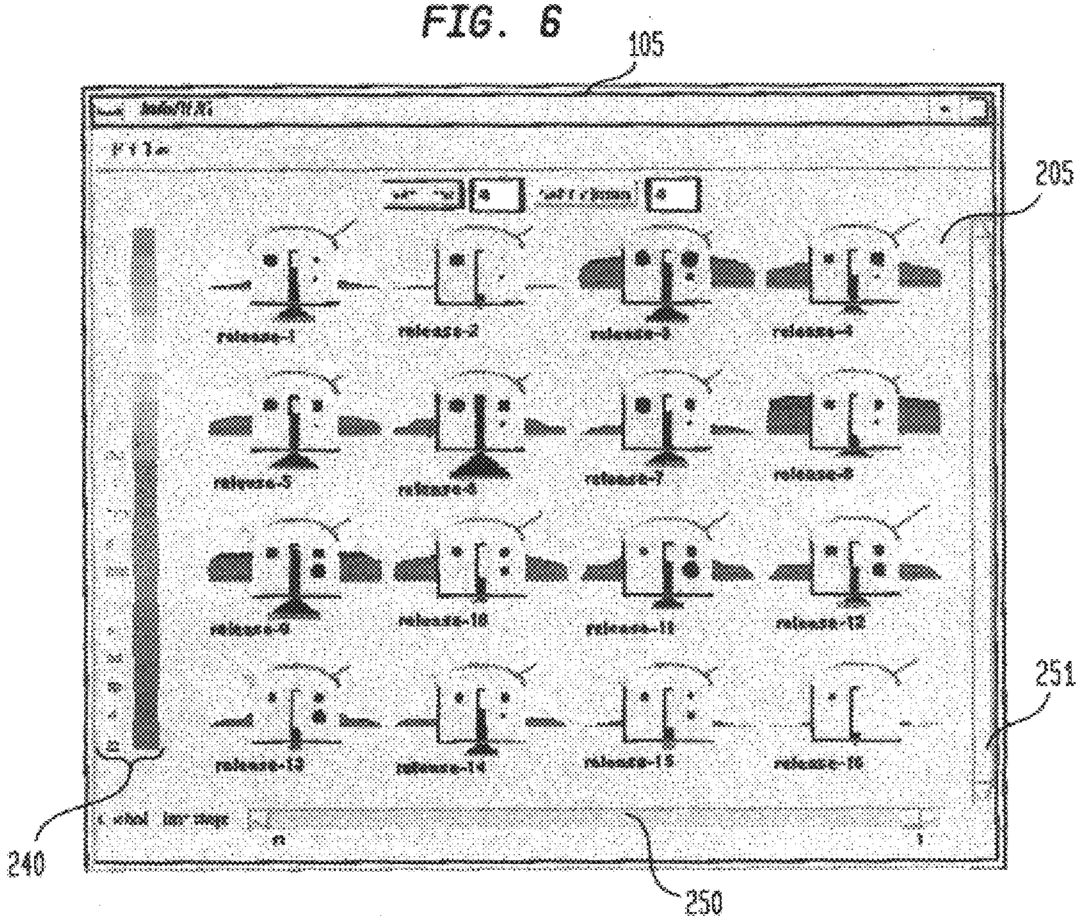
FIG. 6 illustrates a user interface displaying sixteen software glyphs of the first embodiment corresponding to respective sixteen hypothetical releases of an example software project.

If the user desires to visualize the developmental state of the software releases represented in the displayed infoBUG glyphs at a prior point in time, the user may conveniently click on software glyph 200 itself for regenerating such a display, or may select a prior point in time by manipulating time-slider 250, such as shown in FIG. 6. The screen will be cleared at step 165 and the process for generating the new infoBUG glyphs is repeated by returning to step 158 as shown in FIG. 4(*b*).

If timeWheel glyph button 412*b* was chosen, the system proceeds to FIG. 4(*c*). First, at step 301, a new window is displayed on the user graphics screen. Next, at step 303, all of the selected objects to be represented in the timeWheel glyph are acquired and placed in the software construct, e.g., an array A[j]. Initially, visualization mode for the timeWheel glyph is set as normal at step 305, and, at step 306 the current mode is checked. In the normal mode of operation, the provided capability of manipulating glyphs on the screen is disabled. If the system is in the normal mode, then the process continues to draw the timeWheel glyphs from steps 365–375 as indicated in FIG. 4(*d*). Specifically, to enable all of the selected timeWheel objects be rendered on the display screen, the process implements steps identical to steps 155–160 described above with respect to FIG. 4(*b*). Thus, at step 365 in FIG. 4(*c*), the current row on the screen, "curRow", indicating the row where the first software object is to be displayed on the display screen, is initialized to be zero. Then, at step 367, the variable "start" is assigned a value (curRow*numCol) to index the selected object from the array. Then, to display all of the subsequent objects, a loop is entered at steps 368 and 370 for rendering the timeWheel glyphs at successive locations for each selected software object. The process for rendering the timeWheel glyph will be described hereinbelow with reference to FIG. 14(*a*). When there are no more objects to be displayed, the process continues at step 310, FIG. 4(*c*) to wait for additional user input.

If it is determined at step 306, FIG. 4(*c*) that the current mode is not normal, then at step 308, the screen display is cleared, and the system waits for user input at step 310.

As shown in FIG. 4(*c*) user input at step 310 may involve manipulating (mouse clicking) a color bar on the screen display, as indicated at step 312, mouse clicking on a selected generated timeWheel glyph at step 314, moving a scroll bar on the screen display, as indicated at step 316, or setting a mode change at step 318.

Figure 8:
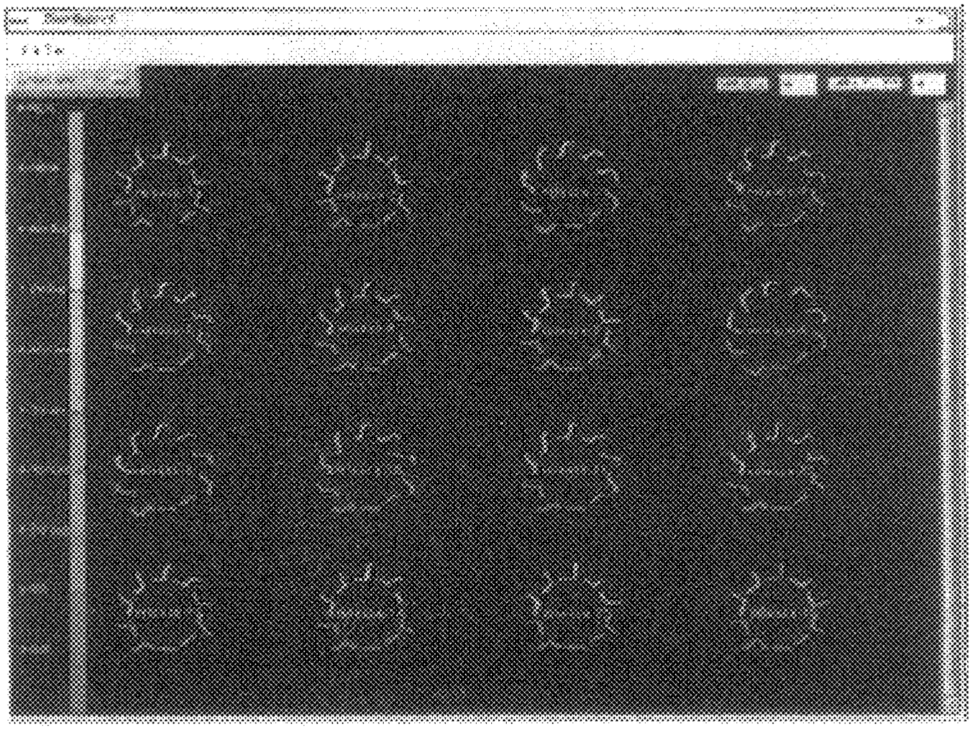
FIG. 8 illustrates the user interface containing sixteen hypothetical software releases each represented by the glyph of the second embodiment.

When in the normal mode of operation, a different color is used to encode object attributes, and the clicking of a color bar displayed, e.g., on the left-hand side of the screen display as shown in FIG. 8, will make attributes either visible or invisible for all of the glyphs displayed, i.e., the software attribute corresponding to the color selected from the color bar, is toggled from off to on, or, vice versa. However, in the normal mode, movement of a displayed object is not allowed. Thus, if the color bar on the screen display was manipulated at step 312, then the process proceeds to step 375 in FIG. 4(*d*), where the current mode is checked. If the mode is normal, then software attribute corresponding to the color selected from the color bar, is appropriately toggled, as indicated at step 372 in FIG. 4(*d*) and all of the glyphs are redrawn with the selected attribute either on/off by returning to step 368.

As will be explained, in the manipulate mode, the whole object is encoded as a single color to enable useful comparisons when objects are overlapped. In the manipulate mode, clicking on the color bar will make the entire glyph appear or disappear. Thus, if, at step 375 in FIG. 4(*d*), it is determined that the current mode is manipulate mode, then, at step 377, a determination is made as to whether the selected object is already drawn. If the selected object was already drawn, then the glyph is cleared, i.e., removed from the screen, at step 379, and the system returns to step 310, FIG. 4(*c*) to await additional user input. Otherwise, if the object was not already drawn, then the timeWheel glyph is drawn at step 380 and encoded with a single color in accordance with the timeWheel glyph rendering procedure described herein with respect to FIG. 14(*b*).

If the timeWheel software glyph was selected by a click of the mouse at step 314, FIG. 4(*c*), then the process proceeds to step 330, FIG. 4(*e*), where a determination is made as to the current mode. If the current mode is normal, the process returns to step 310, FIG. 4(*c*), to wait for additional user input. If the system is in a manipulate mode, then the process proceeds to step 333 to obtain the new timeWheel glyph that had been selected for manipulation by the user. Then, the system waits for additional user input at step 335, which may take the form of releasing the mouse click, whereby the process continues at step 340, or, which may involve moving the mouse, in which case the process continues at step 350.

The manipulation of the timeWheel glyph enables the user to compare attributes of two software releases by superimposing two corresponding timeWheel glyphs corresponding to two software objects (releases), one over the other, for display. In this mode, however, the color of each superimposed timeWheel glyph must be different, with the attributes of each respective glyph uniform in color. Thus, at step 350, the selected glyph is cleared, and wherever the mouse cursor is moved on the display screen, a new timeWheel glyph of uniform color is drawn at step 355 in accordance with the timeWheel glyph rendering procedure described with respect to FIG. 14(*b*).

If, it is determined at step 340, that, after moving the selected glyph on the display screen, the selected glyph is superimposed upon another glyph, then at step 345, the timescales for the encoded attributes for all glyphs are set the same, and the timeWheel glyphs are re-drawn at the same position at step 347 with each glyph having a different color so that they may be accurately compared. In this instance, the timeWheel glyph rendering procedure is described herein with respect to FIG. 14(*b*). Otherwise, if it is determined at step 340, that the selected glyph was moved without superposition, then the process continues to wait for additional user input at step 310, FIG. 4(*c*).

As shown in FIG. 4(*c*), user input at step 310 may involve moving a scroll bar, to view additional releases, e.g., later releases, not presently shown on the display screen. If the scroll bar was manipulated at step 316, then the process proceeds to step 324, FIG. 4(*f*), where a check as to the current mode is made. If it is determined that the mode is normal, then, at step 325, the "curRow" position is altered based on the user selected scroll position, and the "start" variable is incremented in accordance with the new selected software release object and the process for generating the new timeWheel glyphs (steps 367 through 370) is repeated.

If, at step 324, it is determined that the mode is manipulate, then the process continues at step 310, FIG. 4(*c*) to wait for additional user input.

The only other action afforded the user is to voluntarily select the system mode, i.e., normal or manipulate, via a mode change menu (not shown) on the display screen. If the operator chooses to set the display mode at step 318, then the process returns to step 306 where a determination of the selected mode is made.

If, in FIG. 3, the 3D-Wheel glyph button 412*c* was chosen, the process proceeds to step 190 in FIG. 4(*a*). Since the 3D-Wheel attribute is a three-dimensional representation, the glyph is generated in VRML. To achieve this, the program proceeds as follows: first, at step 190, the system contacts the database server. From the server, at step 192, a VRML representation for each data object to be represented in the 3D-Wheel glyph, is generated. Then, at step 194, the VRML representation for the glyph is sent back to the client for eventual loading as a VRML file by Netscape®, as indicated at step 195.

The user is additionally presented with the option to "drill-down" from the higher level scatterplot and display lower level hierarchical scatter-plots containing more detailed software data information. As represented in FIG. 3, by clicking the "Drill" button 412*d*, middle-level 420 and lower-level 430 hierarchical scatter-plots may be displayed. These middle and lower level displays are provided for further scatter-plot representation of lower-level data items for a particular release that may be desirable for a manager or engineer to investigate. For example, as shown in FIG. 3, the manager may select release-8 to cause all changes that were made to release-8 to be displayed on the hierarchy interface shown as the second level scatter-plot 420 of FIG. 3. As indicated in FIG. 3, after user-selection of the Drill button 412*d* (FIG. 3) at step 145, the process first clears the lower level of the hierarchy (step 196), gets the child objects (step 198) and, finally draws the scatter plots at the chosen lower level of the hierarchy (step 198).

The multi-dimensional aspects of the three software glyphs of the invention are herein explained in the context of a hypothetical software system, developed over the last ten years, for example, by thousands of programmers, and such that it has gone through sixteen (16) releases for deployment world-wide. The glyphs of the invention focus on showing the various objects present in this software project, and how these objects change through time.

FIG. 5 illustrates infoBUG software glyph 200, so named because it resembles an insect having four main components: head 203, tail 206, body 209, and wings 212*a, b.* InfoBUG glyph 200 provides an overview of the software objects and facilitates comparisons across those objects. The advantage of an InfoBUG over tiled single-variable plots is that it permits the user to simultaneously compare objects across many dimensions.

As shown in FIG. 5(*a*), each InfoBUG Wing 212*a, b* is a time series with time being encoded from top to bottom. The time is also encoded as color. The x-axis on the left bug wing 212*a* encodes the object size measured in lines of code (loc) and the x-axis on the right bug wing 212*b* encodes the number of errors (err). By comparing the shape of the right and left wings 212*a*, 212*b* respectively, it can be determined whether increases in lines of code, loc, bring about similar increases in number of errors, err. Usually, it would be expected that increases in loc bring about comparable increases in err and vice versa. If loc increases are not accompanied by increases in err, for example, then it may be determined that perhaps the particular object is possibly not being well tested. On the other hand, if increases in err are not caused by similar increases in loc, then the existing code could be inherently difficult, have architectural problems that are causing problems, or be poorly written and in need of re-engineering.

FIG. 6 illustrates an InfoBUG interface 205 presented on a display screen 105 of the computer terminal. The InfoBUG interface 205 is shown illustrating for the hypothetical software system the sixteen (16) software releases each represented by the InfoBUG glyphs indicated as release-1 to release-16. From FIG. 6, the bug wings 212*a,b* for all releases appear symmetrical, indicating that there are no loc/err growth problems at the release level. The position of the wings (whether at the back or to the front) indicates whether an object was worked on early or late in the project. For example, it is readily seen that infoBUG glyphs release-1, release-2, release-7, release-13, release-14, release-15 and release-16 are all new releases because their wings are placed at the back of their bodies. Contrarily, as shown in FIG. 6, infoBUG glyphs for release-3, release-4, release-8, release-9 and release-10 are all older releases, indicated by their wing positions close to their heads.

Within a software object (such as a release, module, or a feature package) there are many different types of code. As shown in FIG. 5(*b*), the InfoBUG Head 203 provides information about the types of code presented in a software release. For example, the head of the example infoBUG software release depicted in FIG. 5(*b*) indicates C-language code 215, and SD language (State Definition) code 217, header lines 219 is used, as well as preprocessor directives and debugging code (not shown). The infoBUG head 203 shows, for a particular point in time, the relative code sizes by type which is color-coded. In the preferred embodiment, a color scale or legend 240 is generated for display at the left portion of the computer display 205, as shown in FIG. 6, to inform the user which code types are represented by which colors.

The type of encoding presented in the infoBUG glyphs enables an analyst to compare the composition of different software objects. For example, in view of FIG. 6 showing the InfoBUG glyphs representing the sixteen releases in the hypothetical system, it is readily seen that most of the releases are made up of C code (shown in orange) and SD code (shown in blue). For example, InfoBUG glyphs release-5 and release-6 indicate that they have significantly more C code and SD code, while InfoBUG glyphs release-1 and release-4 have about equal amounts of both. All of the releases have some small amount of L type code (headers).

As shown in FIG. 5(*c*), the InfoBUG Tail 206 is a triangle-shaped portion of the glyph having a base 207 that encodes the number of code lines added (add) and a height that encodes the number code lines deleted (del). The tail base (i.e. total number of code lines added) is further divided into two parts: a first color coded part 208*a* showing the amount of code added due to error fixing, shown, e.g., in red, and a second color coded part 208*b* showing code added for new functionality, e.g., in green. In view of the sixteen InfoBUG glyphs of FIG. 6 representing the sixteen releases in the hypothetical system, it can be seen that most of the releases consist of code added for new functionality, except for infoBUG glyph release-8 which is a bug-fixing release.

By looking at the shape of the tail 206 the ratio of add to del may be determined. A short squat triangle like the one in infoBUG glyph for release-8 shows a high add/delete ratio. The shapes of the triangles for most of the other releases are less squat, indicating a lower add/delete ratio. Although not shown in any of the releases in FIG. 6, a triangle that is higher than it is wide would indicate that more lines were deleted than added which may indicate a serious problem in the release.

Apart from the shape of the tail, the size of the tail indicates the amount of activity in a particular object. For example, infoBUG glyphs release-6 and release-9 have larger tails indicating more activity than those with smaller tails as shown, e.g., in infoBUG glyphs release-11, release-10. It is interesting to note that release-6 appears to be the largest release but it is a fairly new effort that work only started out on relatively late in the development process.

As shown in FIG. 5(*d*), the InfoBUG body 209 encodes number of file changes (fchg) in the bar 210 located at its center. In addition, it also shows the number of child objects contained within the current parent object. These figures are encoded as the size of the black circles 211 on the insect body 209. The type of child objects encoded depends on the software hierarchy of the system being analyzed. In the system shown, for example, a release object will have as its children modules, supervisors, and packages. A supervisor object on the other hand has developer and feature objects as children.

From FIG. 6 it can be determined that infoBUG glyph representing release-6 has the most number of file changes (fchg). This is not surprising as release-6 also has the most lines of code added and deleted as indicated by its larger tail.

In a preferred embodiment, each of the glyphs presented herein is interactive enabling presentation of further information at the user's request. For instance, clicking the wings 212*a,b* of the infoBUG glyph 200 with mouse 111 in the computer system will cause the selected time slice to be shown in the head 203, body 209 and tail 206 of the infoBUG glyph 200. The current time slice shown is indicated with red band 225 in each of the glyphs shown in FIG. 5 and 6. The time component for all infoBUG glyphs can be changed simultaneously by using the slider mechanism 250 shown at the bottom of the interface screen 205 in FIG. 6. Through interactive manipulation, the analyst can determine how the different data attributes of an object change through time. Stroking the mouse through the wing(s) of objects shows the changes in file type consistency (head), in number of file changes (body) and in the number of lines added and deleted (tail).

By interactively changing the time component, information on how the different code types evolved may be obtained. An example is shown by infoBUG glyph corresponding to hypothetical release release-10 in FIG. 6 which started off only having L type code (header code). Shortly after, C code was added and then more slowly, SD code. Currently C code is most prevalent and SD code next most with about two thirds as much. Such changes will enable user/analyst to determine practices and changes in the requirements for an object.

FIG. 7 illustrates the decomposition of a glyph of a second embodiment of glyphs, hereinafter "Tine-Wheel" glyph 300, which allows the user to view several software data variables through time with each variable being represented as a time series laid out circularly. FIG. 7 shows variables represented in the timeWheel glyph 300 for a hypothetical software developer named userid1. As in the infoBUG glyph, the variables encoded by the height of each of the time series in the timeWheel include: the number of lines of code added 302 (loc), number of errors 304 (err), and the number of file changes 306 (fchg), as shown in FIG. 7. The timeWheel software glyph also represents variables for number of error added lines 308 (aerr), number of error deleted lines 310 (derr), number of new added lines 312 (anew), number of new deleted lines 314 (dnew), number of undefined added lines 316 (audef), and, number of undefined deleted lines 320 (dudef). The audef and dudef variables refer to code changes that have missing data in its purpose field. Additionally represented in the glyph are the number of people (nop) attribute 318 which refers to the number of people that worked on the errors. As described herein, the information ascertained by the timeWheel glyph are useful for the developer or chief engineer in making progress comparisons for a group of engineers. Each of the variables on the timeWheel glyph 300 are color coded according to the color at the left of the timeWheel interface (see FIG. 8). For illustrative purposes, arrows are provided in the timeWheel glyph 300 to indicate the direction of time increment for each variable in the time series.

FIG. 8 shows the timeWheel glyph displayed for the sixteen (16) hypothetical releases release-1 to release-16 shown in FIG. 7. There are three main trends that the user may ascertain from the timewheels in FIG. 8. The first is an increasing trend marked by little activity at the outset followed by increasing activity as can be seen from the variables in the timeWheel glyphs for release-1, release-2, release-7, release-13, release-14, release-15 and release-16 shown in FIG. 8. Not surprisingly, these are all the later releases thus, providing an indication that most of the effort came late in the development process. The second type of trend is the tapering trend or the decreasing trend which is indicated by the high activity at the outset which slowly tapers off with time. As shown in FIG. 8, release-3, release-4, release-8, release-9 and release-10 exhibit this trend as these are the older releases that were developed earlier on in the development process and then completed. Finally, the third group of objects are between the prior two classes which may be ascertained as containing objects that were developed in the middle of the development process.

From FIG. 8 it is shown that all the time trends within an object have approximately the same shape, except for the two flat time series 316 (dudef) and 320 (audef) which indicates that there is no missing data and which further indicates that there are no deviations from the dominant trend of progress.

Figure 9:
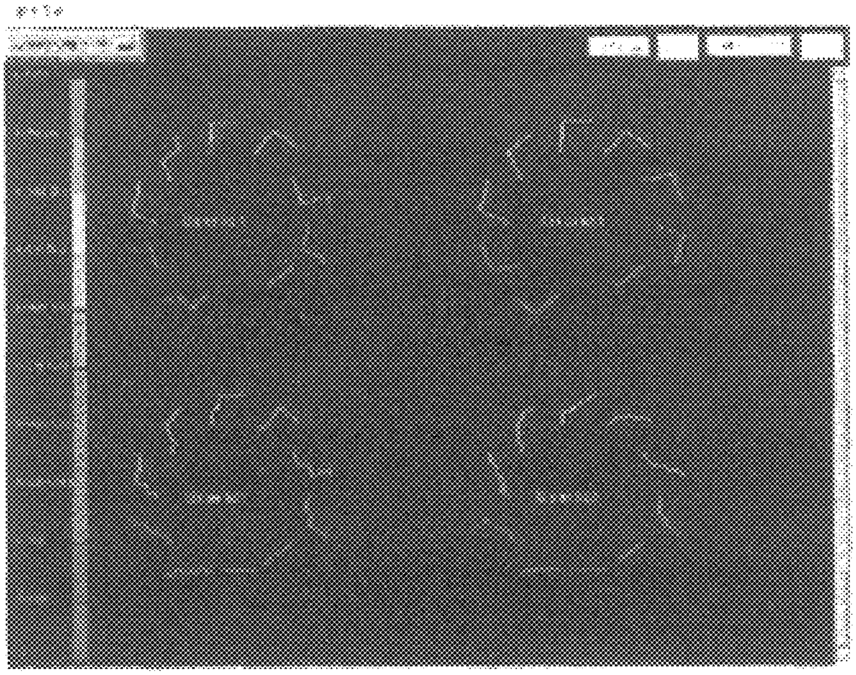
FIG. 9 illustrates the display of four glyphs of the second embodiment containing profiles of four example developers that worked on hypothetical software modules for a particular release.

FIG. 9 shows timeWheel glyphs for four primary developers userId1, userId2, userId3 and userId4 that worked on hypothetical moduleX and moduleY modules. As shown in FIG. 9, userId1 and userId2 have increasing trends while userId3 and userId4 have tapering trends. Even though userId2 has an increasing trend, there are divergent variables. The interesting information to derive from userId2's timeWheel glyph display in FIG. 9, is that the aerr attributes 308 and derr attributes 310 have tapering trends while the anew attributes 312 and dnew attributes 314 have increasing trends. Because the trend for the loc attribute 302 (color red) is increasing, it may be deduced that most of the code added was from new features. In addition, it is suggested that there are two clear phases for developer userId2, first, userId2 did error fixes but later moved on to developing new code. Additionally, it is also deduced that code development accounted for a more important portion of userId2's activities because it corresponds to the dominant trend. All this information would have been lost in other visualizations because detailed time information is not shown. FIG. 6 shows that like userId2, the other developers, userId1 and userId4 also have divergent trends. As can be seen in these examples, the timeWheel glyph 300 allows users to easily pick out dominant trends and identify deviations of individual variables from that trend.

A third embodiment of glyphs, the 3D-Wheel glyph 400, allows the user to view several variables through time three-dimensionally. As shown in FIG. 10, the 3D-Wheel glyph encodes the same data attributes as the timeWheel glyph but utilizes the height dimension to encode time. Each object variable is encoded as an equal slice of a circle and the radius of the slice encodes the size of the variable, just like in a rose-diagram. Each variable is also color coded as in the timeWheel glyph display.

An object in the 3D-wheel glyph 400 that has a sharp apex has an increasing trend through time and an object that balloons out has a tapering trend. FIG. 10 shows the same 16 releases of FIGS. 6 and 8 as 3D-Wheel glyphs. It is easier to perceive the overall time trends from the 3D-Wheel glyphs (FIG. 10) than the timeWheel glyphs (FIG. 8). This is because in the 3D-wheel, the trend is clearly expressed by the shape of the wheel whereas in the timeWheel glyph 300 the trend has to be derived from the wheel pattern of each object.

Figure 11A:
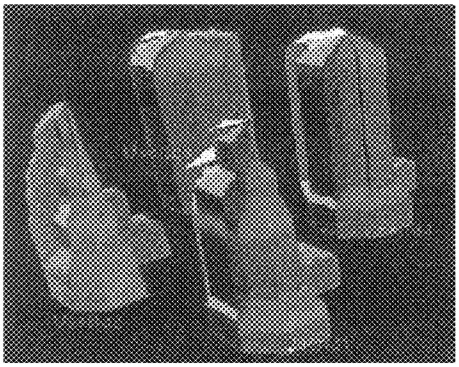
FIG. 11(*a*) illustrates the display of four glyphs of the third embodiment containing profiles of four example developers that worked on the same hypothetical software modules for a particular release as shown in FIG. 9.
Figure 11B:
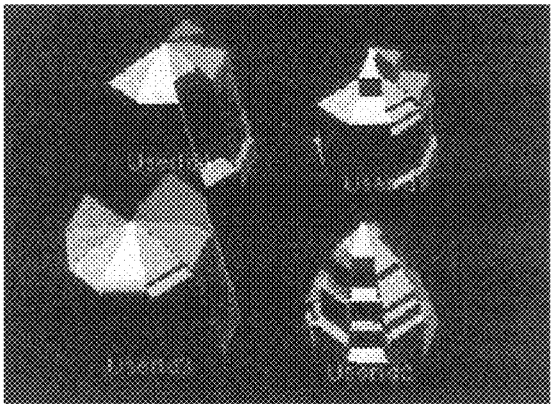
Figure 11C:
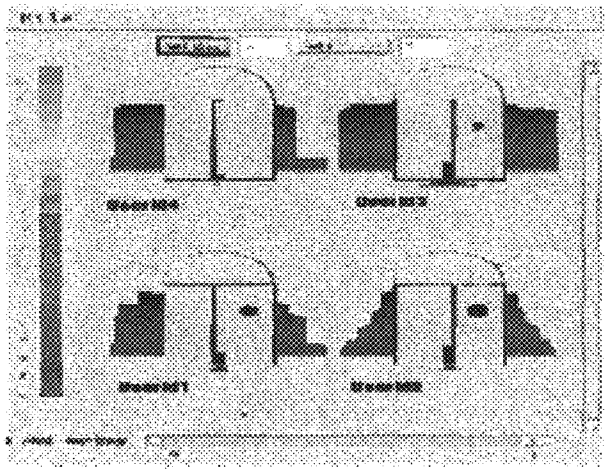

While it is easier to identify trends using the 3D-Wheel, it is harder to identify divergence because of visual occlusion and perspective. Users must utilize tools provided in the browser, for example, to rotate the 3D-objects to enable visualization of the data and this may involve a significant amount of manipulation. For example, FIG. 11(*a*) shows the same four developers of FIG. 9 as 3D-wheels with developer userId2 at the bottom right of the display. Note that it is a harder to see the difference in trends between the aerr, derr, nop attributes (which have a more tapering trend) compared to the other attributes because part of the 3D-Wheel glyph 300 is occluded. FIG. 11(*b*) show the same objects as FIG. 11(*a*) except from a different point of view. In FIG. 11(*b*), userId2 is on the bottom left and the difference between the increasing trend of the blue (fchg, err) and red (loc) slices compared to the tapering trend of the orange (nop) slice is easily visualized.

The following description is an example scenario of how a software manager owning a particular subsystem for the releases described in the hypothetical system, may explore the available data for possible problems. The different glyphs have been integrated using a hierarchical sequence of tiled scatter plots labeled 420, 430 and 440 , such as shown in FIG. 3. This hierarchy is based on the software hierarchy described in FIG. 2 but with some modification. At the x-axis of each scatter-plot the number of code lines (loc) has been encoded and, at the y-axis the number of errors (err) has been encoded. This encoding is made because the ratio of err/loc helps determine the quality of a software object. The y-scale on FIG. 3 may be transformed using a sqrt or log transformation. It should be understood that the x and y axes may be encoded with other statistics depending upon the requirements of the software manager or engineer.

First the manager loads all the relevant software releases (top FIG. 3). Since there are only sixteen (16) hypothetical releases involved, the detailed infoBUG views are obtained on all the objects. This is achieved by selecting all objects with a mouse click or with a bounding box, and then pressing the BUG button 412*a* on the interface scatterplot 410. The infoBUG view on all sixteen (16) releases is shown in FIG. 6. In view of the infoBUG screen such as shown in FIG. 6, it may readily appear to the manager that the object release-8 has significantly more bug-fixing code lines than the other releases.

To investigate further, the manager may then select release-8 to cause all changes that were made to release-8 to be displayed on the hierarchy interface shown as the second level scatter-plot 420 in FIG. 3. The changes that were made are displayed according to module, supervisor, and feature. In this view, the manager looks at all the supervisors in charge and picks the ones that were most involved with this particular release (i.e. has high number of code lines), namely sup-1 and sup-2, and hands the problem over to them.

The supervisors examine the module and feature information for release-8 and finds that in particular, changes were made to moduleY and moduleX. Drilling down on these modules causes the lower level scatterplot 430 of the hierarchy shown in FIG. 3 to reveal the individual developers and other low-level features. From this scatter-plot interface, it seems that the primary developer involved in changing moduleX and moduleY for release-8 is userId3. The main low-level feature involved in this change is feature-1.

To get more information, the supervisor may look at the global profile of the low-level feature to see if the problem is special to this particular release or is common across releases. The global data of feature1, viewed as an infoBUG glyph (not shown), show that this particular problem is present globally and the supervisor may make note of this. There is a possibility that the high errlloc ratio may have caused the release to be delayed. To check on lateness the supervisor brings up a timeline display for release-8.

Figure 12:
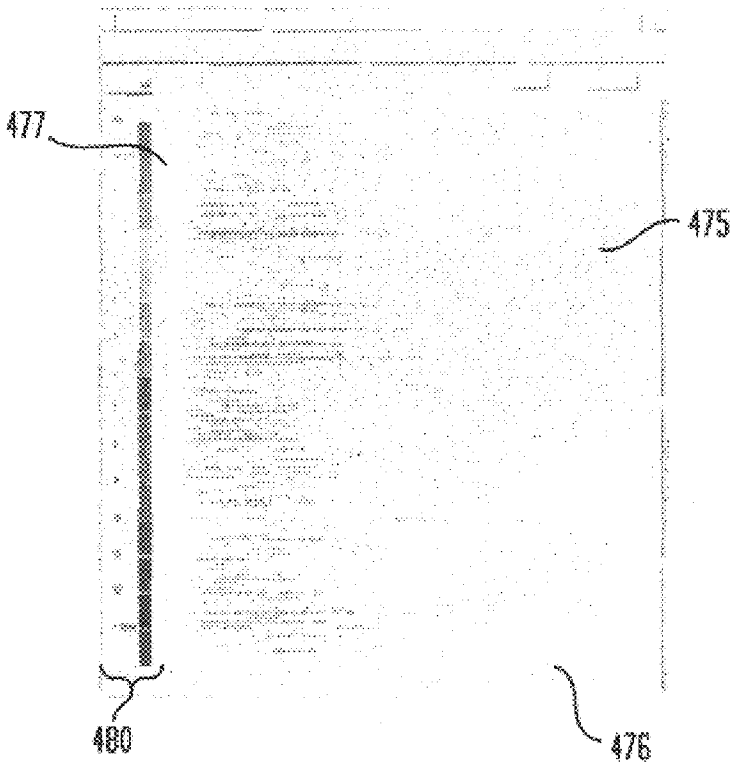
FIG. 12 illustrates a TimeLine display of a hypothetical software release having a lateness attribute encoded as color.
Figure 13A:
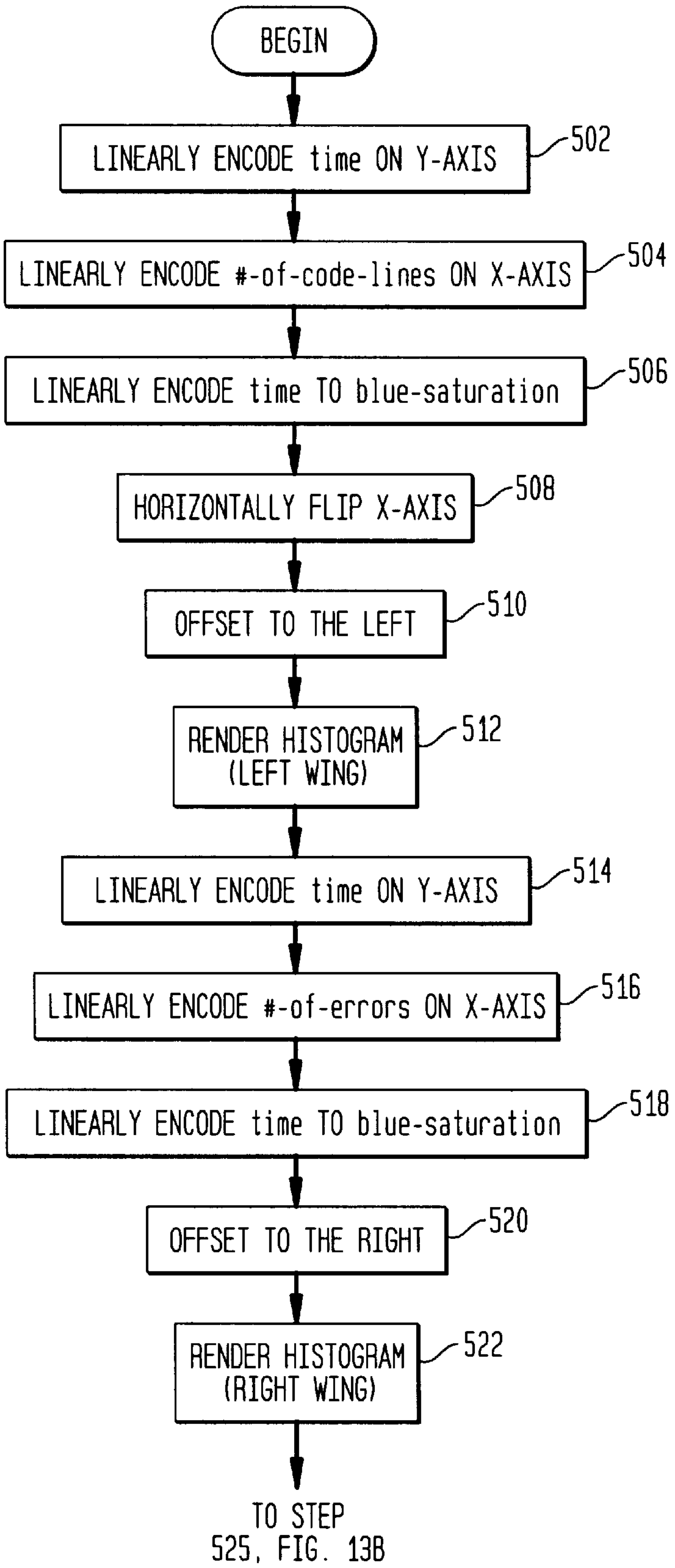
FIGS. 13(*a*)–13(*d*) are flow diagrams depicting the process for generating glyph attributes of the software glyph of the first embodiment.
Figure 13B:
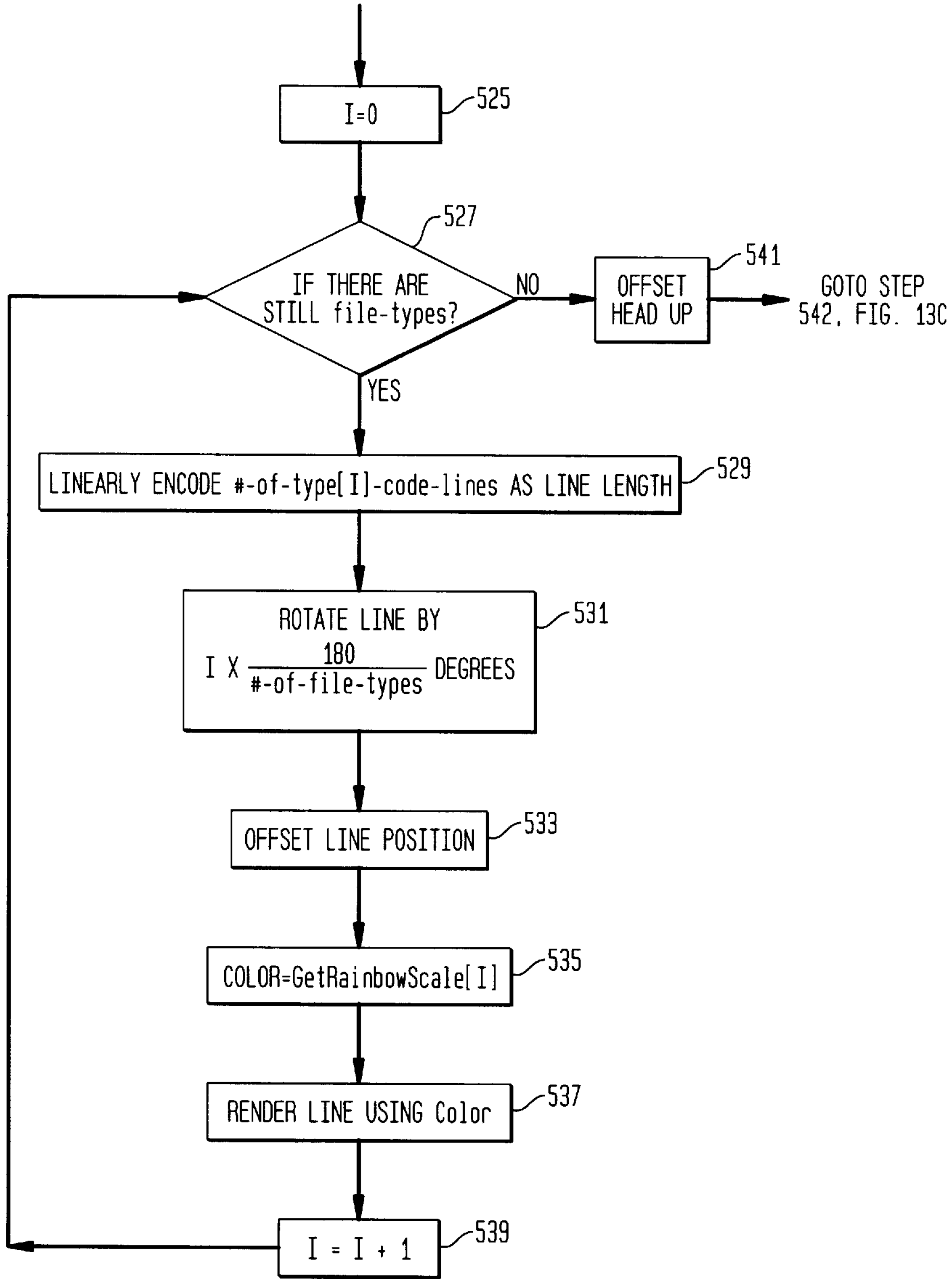
Figure 13C:
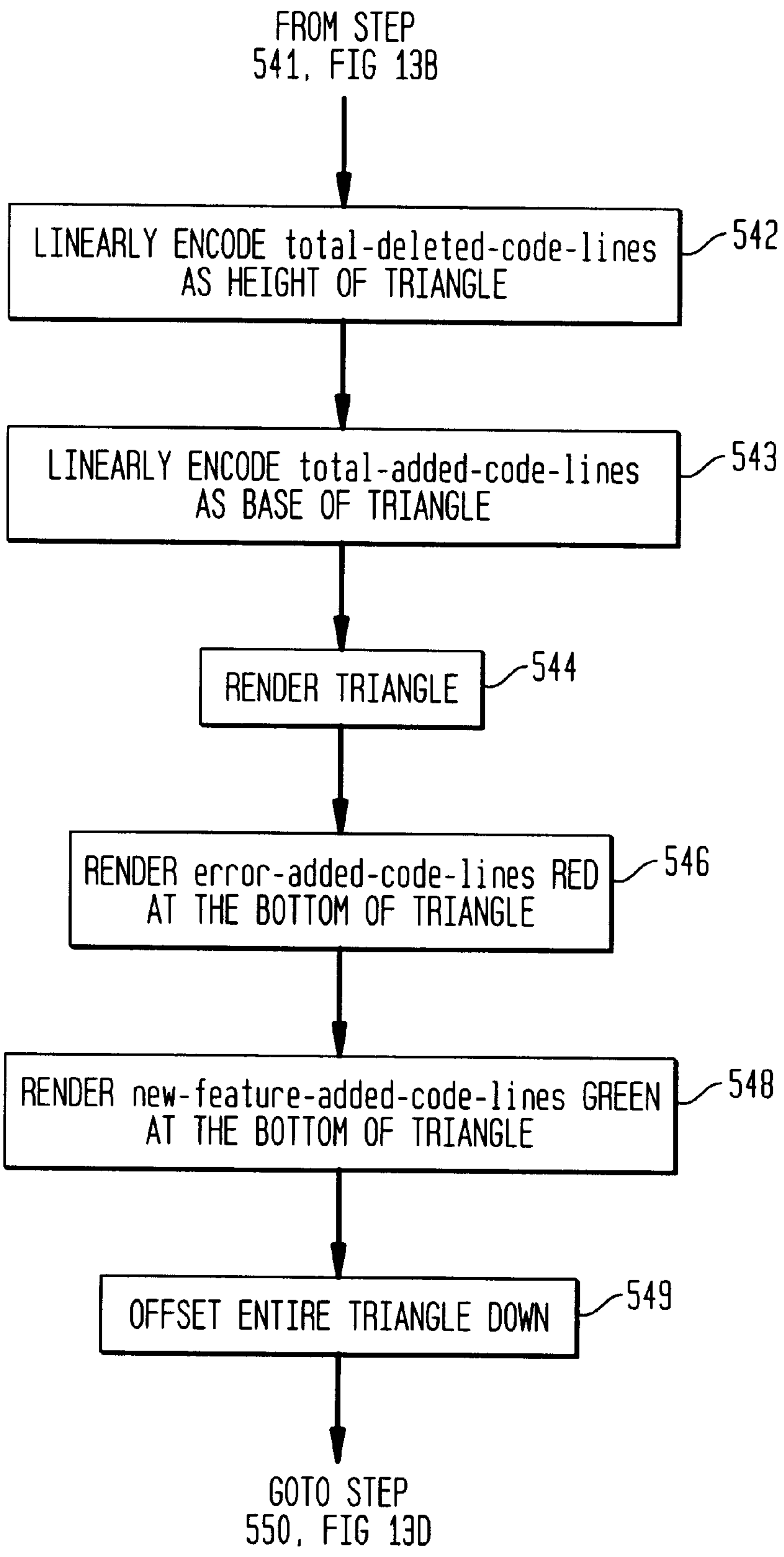
Figure 13D:
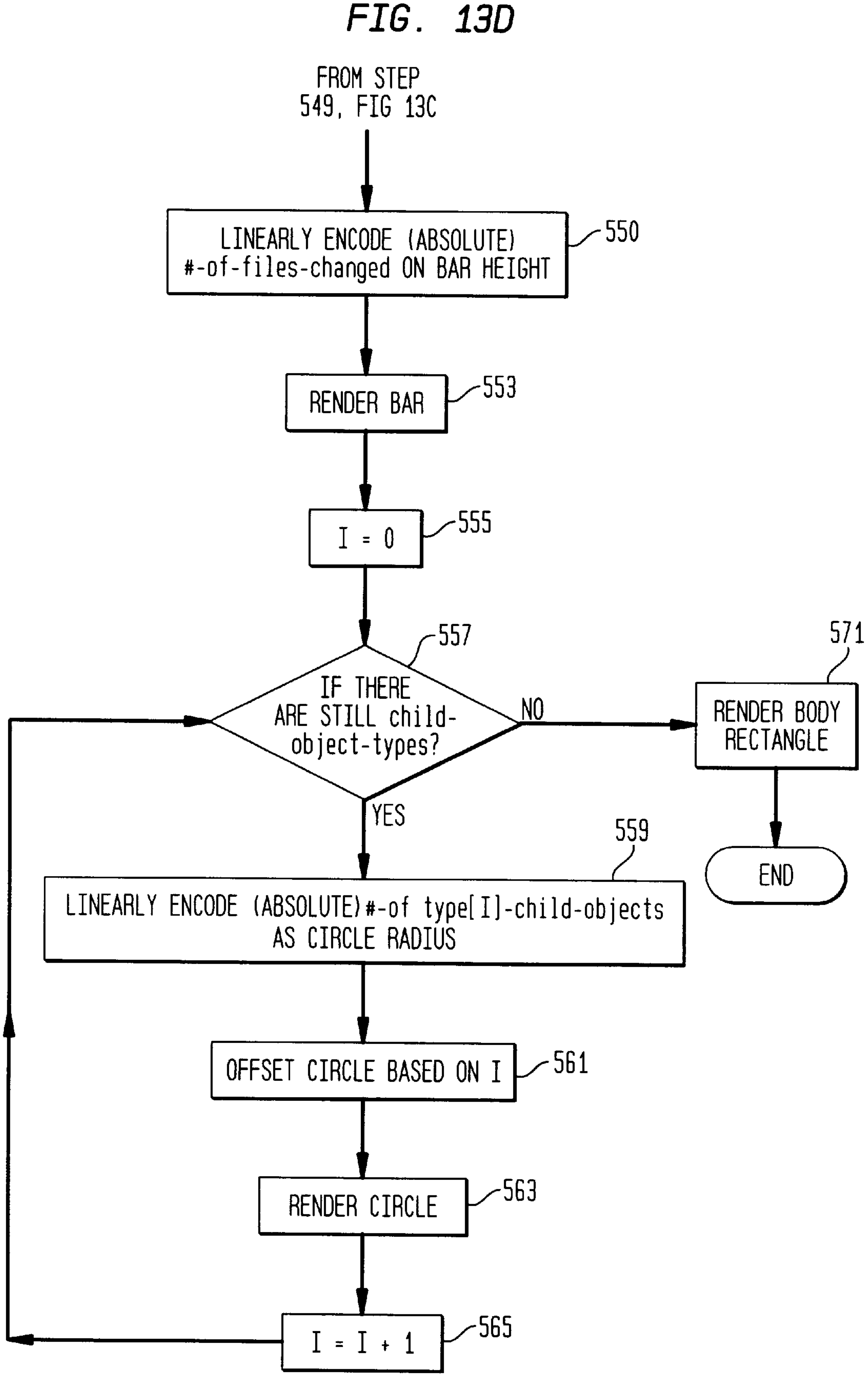

The timeline display is generated by selecting timeline button 412*e* as shown in the high-level scatterplot drawing of FIG. 3. The timeline display 475 such as shown in FIG. 12 is used to view detailed information about each error, and particularly a lateness attribute for particular types of code. For instance, the x-axis 476 of each timeline display 475 encodes time and the y-axis 477 encodes the developers who worked on the error. As shown in FIG. 12, e.g., the start of each line represents the time at which the errors were opened for fixes and the end of each line encodes when the error was fixed. Other properties of the error (e.g. priority, severity, lateness) may be mapped or encoded by the color of the lines. The color encoding is shown by the color bar 480 along the y-axis of the display 475. In the example timeline plot of FIG. 12, a supervisor may discover that there are no serious lateness problems in the release shown.

The supervisor may then start to examine the four main developers involved in modules moduleX and moduleY. These developers are userId1, userId2, userId3, and userId4 having global profiles as shown in FIGS. 9 and 11(*a*)–11(*c*). UserId3 is the primary contributor by far. As seen from the infoBUG view of the global profile of userId-3 (FIG. 11(*c*)), it appears that userId3 is a bug fixer. This can be derived from the infoBUG glyph tail base which is predominantly red. The timeline display of userId3 (now shown) further shows that developer is conscientious of fixing his bugs promptly. At this point the supervisor contacts developer userId3 and asks him for information on the problem. If UserId3 is currently working on multiple different releases and is unable to recall what the situation is with this particular problem, he may run the system and perform the drilling based on the information provided by the supervisor. He then loads in the files associated with the problems and examines them utilizing readily available software, SeeSoft, in the manner as described in S. G. Eick, J. L. Steffen, and E. E. Sumner, Jr., "SeeSoft-A Tool for Visualizing Line-Oriented Software Statistics," IEEE Trans. Software Eng., Vol 18, No. II, 1992, pp. 957–968, the whole contents and disclosure of which is incorporated by reference as if fully set forth herein. UserId3 may also use the timeline display to view the actual bug concepts that were involved and summarizes his findings for his supervisor, providing visual aids where necessary.

The above-described scenario demonstrates that it is important to have a system that spans different levels of data abstraction because different levels of the organization are interested in different parts of the data. By having all this within the same system, the people involved can communicate through a common base and share their findings. The system can be integrated with existing tools and allows the expert users of those tools to investigate problems further.

As mentioned, two of the software glyphs, the infoBUG and timeWheel glyphs, described herein are preferably generated utilizing Java® (by Sun Microsystems) and the 3D-Wheel glyph is generated using VRML that can be interpreted by, e.g., the Netscape browser. FIGS. 13(*a*)–13(*d*) illustrate generally the steps for generating the infoBUG glyph 200 of FIG. 5. As shown in FIG. 13(*a*), steps 502–512 describe the steps for rendering the left wing 212*a* of the infoBUG glyph, and steps 514–522 illustrate the steps for rendering the right wing 212*b* of the infoBUG glyph. As shown in FIG. 13(*b*), steps 525–541 illustrate the steps for rendering the infoBUG glyph head 203, and, in FIG. 13(*c*), steps 542–549 illustrate the steps for rendering the infoBUG glyph tail 206. As shown in FIG. 13(*d*), steps 550–571 illustrate the steps for rendering the infoBUG glyph body 209.

For the infoBUG left wing 212*a,* at step 502, time, e.g., a span of months, is linearly encoded on the y-axis of the display and, at step 504, the loc component is linearly encoded on the x-axis of the display. The next step 506 involves linearly encoding the time component to different shades of the color blue. Through software, at step 508, the x-axis (loc component) is horizontally flipped and at step 510 is offset to the left so that the magnitude of the loc component increases from right to left. Then, at step 512, a histogram of the loc component verses time is rendered and the encoded x–y plot is saturated with the encoding blue color to form the left wing. The generation of the right wing 212*b* is virtually identical with the time components of the particular release being linearly encoded on the y-axis of the display at step 514 and, at step 516, the err component being linearly encoded on the x-axis of the display. The next step 518 involves linearly encoding the time component to the color blue and offsetting the err component to the right at step 520 so that the magnitude of the err component begins from the right side of the infoBUG body. Then, at step 522, a histogram of the err component verses time is rendered to form the right wing.

For the head 203 of infoBUG glyph 200, as shown in FIG. 13(*b*), step 525, an index "i" relating to the types of files in the software release is first initialized to zero. As an example, type[1] (i=1) may be the number of header code lines and type[2] (i=2) might be the number of C_language code lines. At step 527, a decision is made as to whether there are still file types that need to be rendered in the infoBUG glyph head. If there remain file types, then the program proceeds to step 529 where the number of type[i] code lines is linearly encoded as a line length. At step 531, the system will compute a rotation amount as a function of the index so that the corresponding line length may protrude at an angle from the head of the glyph. For the type[i] line length, the system computes a predetermined rotation (in degrees) according to the following equation:

$$i\times\left(\frac{180}{totalnumber\text{-}of\text{-}file\text{-}types}\right)^{\circ}.$$

Next, at step 533, for the file type[i], the position where the rotated line length will start along the infoBUG glyph head is offset according to the current index, and at step 535, the color component for that type[i] file is computed from a table called GetRainbowScale[i]. For e.g., as mentioned above, C-language type code lines may be represented as an orange color. Then, at step 537, the line length for the number of lines of type[i] code is rendered with the color from GetRainbowScale[i]. Finally, at step 539, the index "i" is incremented so that the head of the infoBUG glyph may present the next type of file contained in that particular software release by repeating the process beginning at step 527.

If, at step 527 there are no more file types to be represented, then at step 541, the finally rendered glyph head 203 is offset by an amount so as to position it at the top of the infoBUG glyph.

To render the tail 206 of infoBUG glyph 200, as shown in FIG. 13(*c*), step 542, the del component for the particular release is linearly encoded as the height of a triangle, and, at step 543, the add component is linearly encoded as the base of the triangle. The next step 544 involves rendering the triangle. Next, at step 546, the number of error added code lines (aerr) component is rendered as the color red at one portion of the triangle base, at step 548, the number of new feature added code lines is rendered as the color green at an opposite portion of the triangle base. Finally, at step 549, the rendered infoBUG glyph tail 206 is offset by an amount so as to position it at the bottom of the infoBUG glyph such as shown in FIG. 5.

To render the body 209 of infoBUG glyph 200, as shown in FIG. 13(*d*), step 550, the fchg component is linearly encoded as the height of a bar and which is rendered at step 553. At step 555, an index "i" relating to the types of child objects for the software release is first initialized to zero. The type[i] child objects relate to the abstractions levels in the hierarchical software object chart of FIG. 2. At step 557, a decision is made as to whether there are still child-object types that need to be rendered in the infoBUG glyph body. If there remains child-object types, then the program proceeds to step 559 where the number of type[i]-child objects is linearly encoded as a circle radius. Next, at step 561, for the child object of type[i], the encoded circle is offset in the glyph in accordance with the current index, and at step 563, is rendered. Finally, at step 565, the index "i" is incremented so that the body of the infoBUG glyph may present the next child object of that particular software release by repeating the process beginning at step 557.

If, at step 557 there are no more child object types to be represented, then at step 571, the rectangular portion of the infoBUG glyph body 209 is rendered.

Figure 14A:
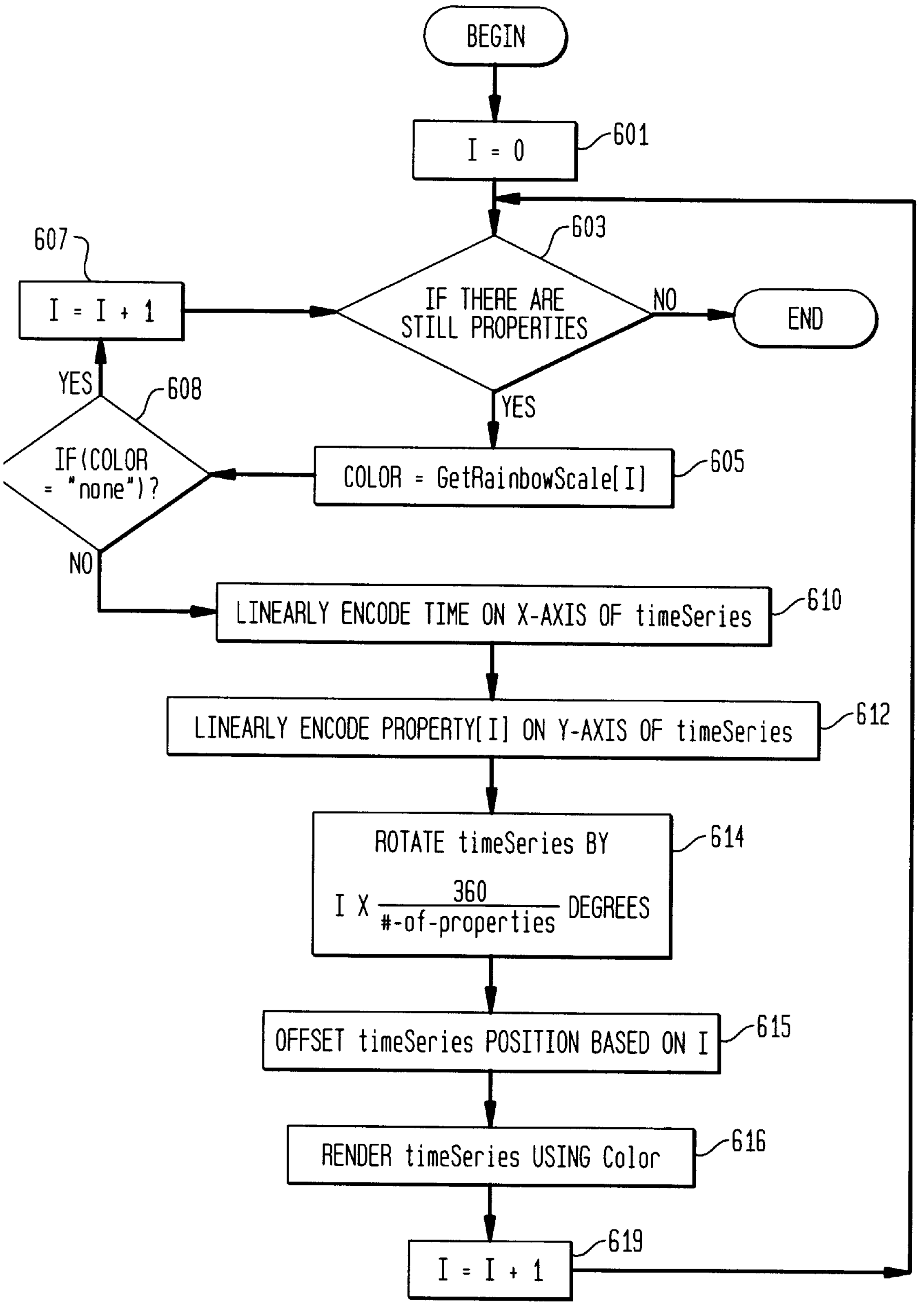
FIGS. 14(*a*) and 14(*b*) are flow diagrams depicting the process for generating glyph attributes of the software glyph of the second embodiment.
Figure 14B:
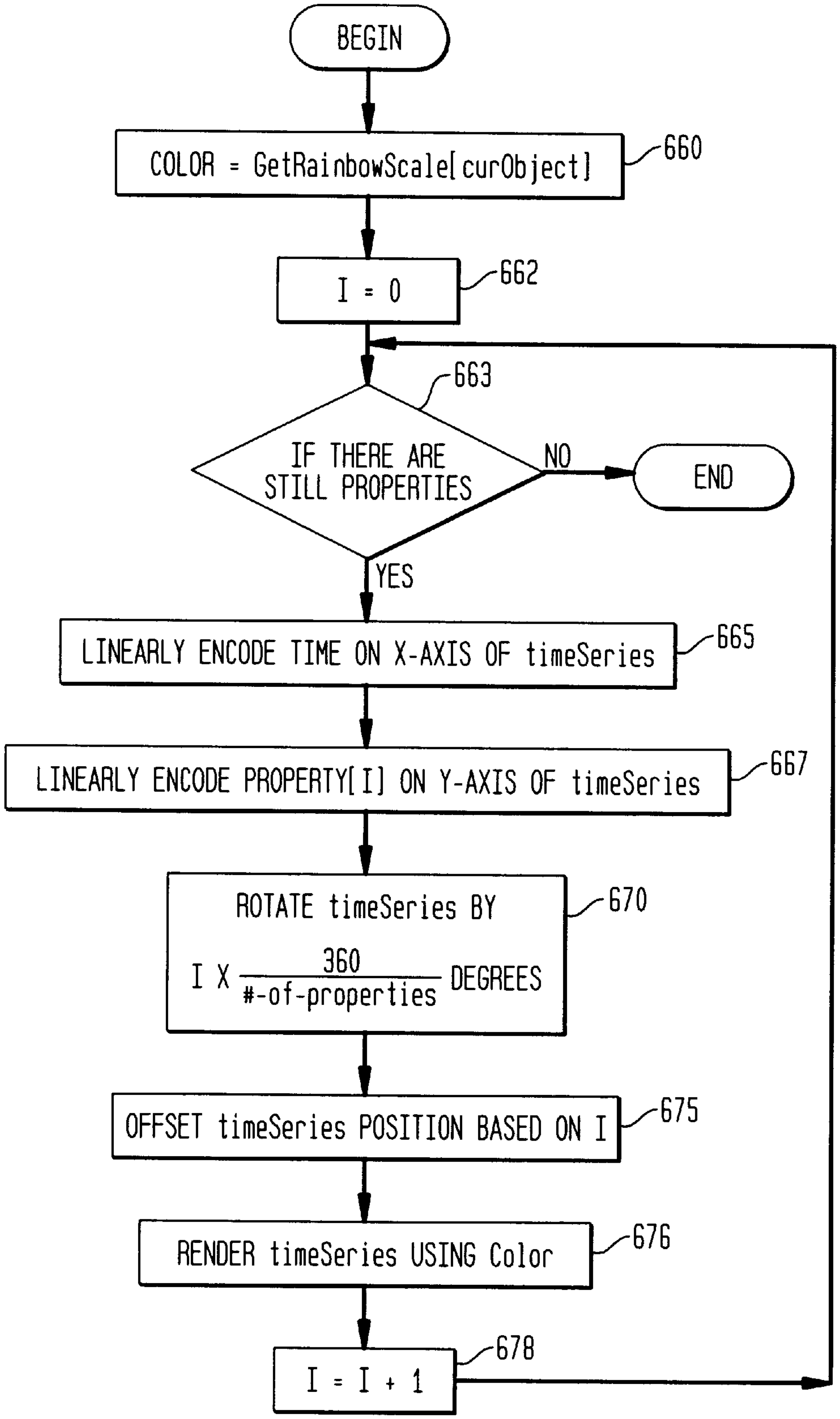

FIG. 14(*a*) illustrates generally the steps for generating the timeWheel glyph 300 of FIG. 7 having some or none of the color attributes toggled to the off position, as described with herein with respect to FIG. 4(*d*). As shown in FIG. 14(*a*), step 601, the process begins by initializing to zero an index "i" relating to the number of software variable types (attributes) of a particular software release. As an example, property_type[1] (i=1) may be the number of new added lines (anew) lines and property_type[2] (i=2) might be the number of new deleted lines (dnew). Then, at step 603, a decision is made as to whether there are still property types (software attributes) that need to be rendered in the timeWheel glyph. If there remain property_types, then the program proceeds to step 605 where the color component for the current property_type[i] variable is computed from a table called GetRainbowScale[i]. Next, at step 608, a decision is made as to whether the user has chosen to toggle that color "off" at step 372, as described with respect to FIG. 4(*d*). If the color for that particular attribute has been toggled off, then the index "i" is incremented at step 607 and the process continues at step 603. If the color has not been toggled off, then the process proceeds at step 610 where time component of the software attribute is linearly encoded on the x-axis of a time series and, at step 612, the property_type[i] is linearly encoded on the y-axis of that time series. Next, at step 614, the system computes a rotation amount (in degrees) as a function of the index in order to position the current time series in the timeWheel glyph. The rotation amount for the time series is computed in accordance with the equation (1), as follows:

$$i \times \left( \frac{360}{totalnumber\text{-}of\text{-}property\text{-}types} \right)^{\circ}. \tag{1}$$

Then, at step 615, for the property_type[i], an offset position where the rotated time series will be positioned along the timeWheel is computed according to the current index, and at step 616, the time series for the current property_type[i] is rendered with the color from GetRainbowScale[i]. Finally, at step 619, the index "i" is incremented so that the timeWheel glyph may include a time series for the next property_type for that particular software release by repeating the process beginning at step 603.

If, at step 603, there are no more property_types to be represented, then the process ends.

FIG. 14(*b*) illustrates generally the steps for generating the timeWheel glyph 300 of FIG. 7 that is to be superimposed upon another glyph. As described above, with respect to FIG. 4(*e*), the color of the object is uniform to enable comparison of like attributes of the superimposed timeWheel glyphs. Thus, for drawing the timeWheel glyph having uniform color, the process begins at step 660, FIG. 14(*b*) where one color for that particular selected object ("curObject") is obtained from the GetRainbowScale array. Next, at step 662, the process begins by initializing to zero an index "i" relating to the number of software variable types (attributes) of a particular software release. As described above, property_type[1] (i=1) may be the number of new added lines (anew) lines and property_type[2] (i=2) might be the number of new deleted lines (dnew). Then, at step 663, a decision is made as to whether there are still property types (software attributes) that need to be rendered in the timeWheel glyph.

The process then proceeds to step 665 where time component of the software attribute is linearly encoded on the x-axis of a time series and, at step 667, the property_type[i] is linearly encoded on the y-axis of that time series. Next, at step 670, the system computes a rotation amount (in degrees) as a function of the index in order to position the current time series in the timeWheel glyph. The rotation amount for the time series is computed in accordance with equation (1) set forth above. Then, at step 675, for the property_type[i], an offset position where the rotated time series will be positioned along the timeWheel is computed according to the current index, and at step 676, the timeSeries for the current attribute is rendered with the color obtained at step 660. Finally, at step 678, the index "i" is incremented so that the timeWheel glyph may include a time series for the next property_type for that particular software release by returning to step 663. It is understood that in this process, each timeSeries of the glyph (curObject) is rendered in the same color, to aid in the comparison with another differently colored object as described above.

Figure 15:
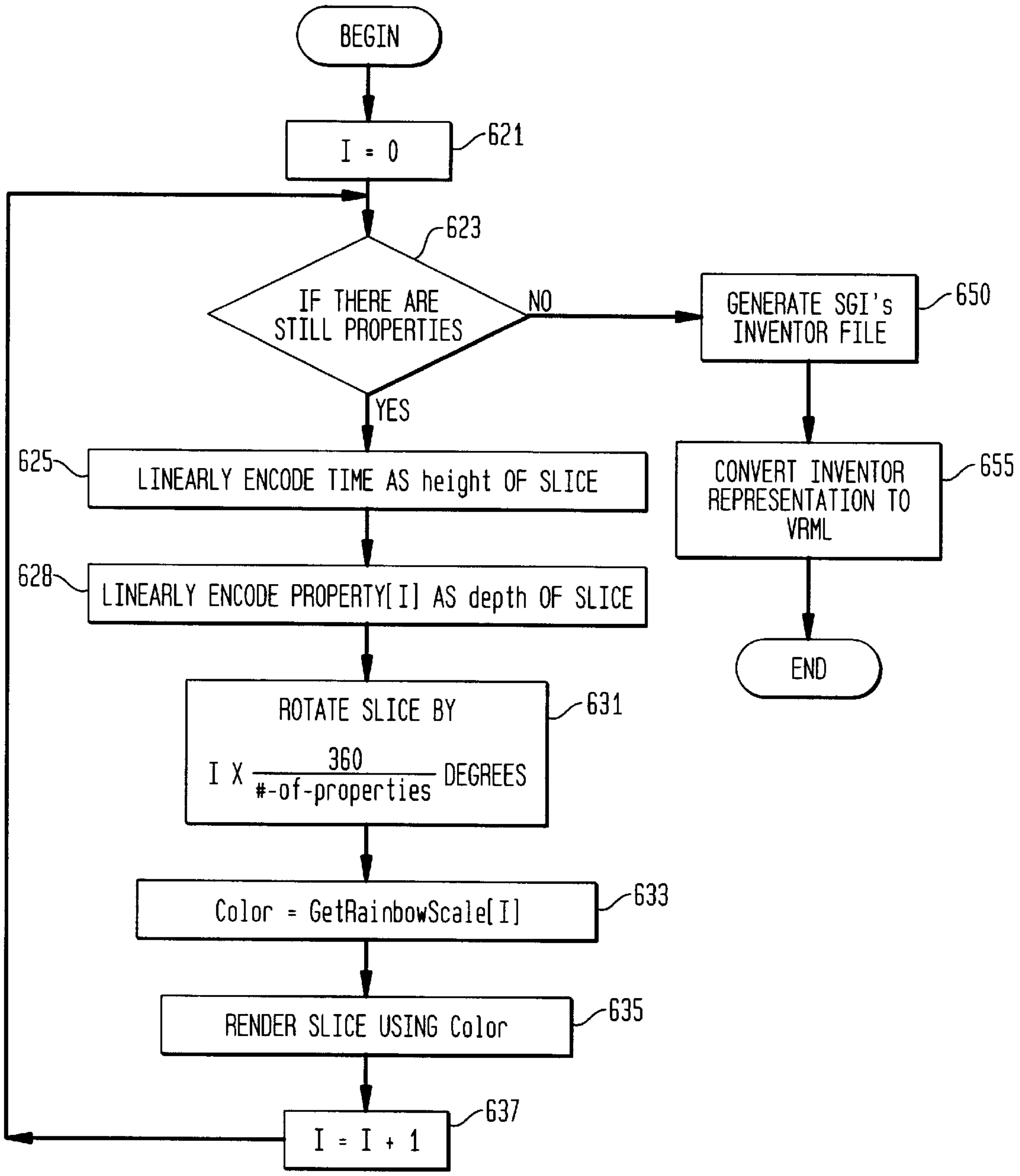
FIG. 15 is a flow diagram depicting the process for generating glyph attributes of the software glyph of the third embodiment.

FIG. 15 illustrates generally the steps for generating the 3D-Wheel glyph 400 of FIG. 9. As shown in FIG. 15, step 621, the process begins by initializing to zero an index "i" relating to the number of software variable types of a particular software release. The variables are identical with those represented in the timeWheel glyph. Then, at step 623, a decision is made as to whether there are still property types that need to be rendered in the 3D-Wheel glyph. If there remain property__types, then the program proceeds to step 625 where time is linearly encoded as the height of the slice and, at step 628, the property__type[i] is linearly encoded as the depth of the slice. At step 631, the system will compute a rotation amount (in degrees) as a function of the index in order to position the current slice in the 3D-Wheel glyph. The rotation amount for the slice is computed in accordance with the following equation:

$$i \times \left( \frac{360}{totalnumber\text{-}of\text{-}property\text{-}types} \right)^{\circ}.$$

Next, at step 633, the color component for that property__type[i] variable is computed from a table called GetRainbowScale[i]. Then, at step 635, the slice for the current property__type-[i] is rendered with the color from GetRainbowScale[i]. Finally, at step 637, the index "i" is incremented so that the 3D-Wheel glyph may include next property__type of that particular software release by repeating the process beginning at step 623 to completely render the 3D-Wheel glyph.

If, at step 623, there are no more property__types to be represented, then the system proceeds to step 650 to generate an "Inventor" file representation of the now completely rendered 3D-Wheel glyph. At step 655, the "Inventor" file representation of the 3D-Wheel glyph is converted to VRML format where it may be exported to other networks and systems having VRML graphics capabilities.

The foregoing merely illustrates the principles of the present invention. Those skilled in the art will be able to devise various modifications, which although not explicitly described or shown herein, embody the principles of the invention and are thus within its spirit and scope.

What is claimed is:

1. A data visualization system comprising:

means for retrieving data representing different data items; and means for organizing said data for display as a multi-dimensional glyph having one or more component objects with an appearance resembling an insect, said component objects each being color-coded to represent a different one of a plurality of data items, each said component object having an attribute encoding changes in a value of its respective one of said data items over time.

2. A data visualization system as claimed in claim 1, wherein said glyph has a first wing-shaped portion for encoding a first data item and a second wing-shaped portion for encoding a second data item.

3. A data visualization system as claimed in claim 2, wherein said first data item represents lines of software code added to a software release during a period of time and said second data item represents software errors incurred over said period of time.

4. A data visualization system as claimed in claim 1, wherein said glyph includes color objects forming a head portion for said glyph, each color object in said head portion of said glyph representing a data item.

5. A data visualization system as claimed in claim 4, wherein said data item represents a type of software code present in a software release.

6. A data visualization system as claimed in claim 1, wherein said glyph includes component objects forming a tail portion for encoding one or more data items for said glyph.

7. A data visualization system as claimed in claim 6, wherein said tail portion includes a base portion encoding a first data item, said base portion having a length dimension representing a first type of data item activity occurring over a period of time, and a height dimension representing a second type of data item activity occurring over said period of time.

8. A data visualization system as claimed in claim 7, wherein said first data item represents a type of software code present in a software release, said first type of data item activity representing number of lines of code added over said time period and, said second type of data item activity representing number of lines of code deleted in said time period.

9. A data visualization system as claimed in claim 7, wherein said base is divided into a first color coded portion representing amount code added due to software error fixing and a second color coded portion representing amount of code added due to new software functionality.

10. A data visualization system as claimed in claim 1, wherein said glyph includes component objects forming a body portion for encoding one or more data items for said glyph.

11. A data visualization system as claimed in claim 10, wherein said body portion encodes number of file changes for a particular point of time and the number of child objects relating to lower level details of a software release.

12. A data visualization system comprising:

means for retrieving data representing different data items; and means for organizing said data for display as a multi-dimensional glyph having one or more component objects formed in a substantially circular shape, said component objects each being color-coded to represent a different one of a plurality of data items, each said component object having an attribute encoding changes in a value of its respective one of said data items over time, each of said encoded data items resembling a slice of said substantially circular shape with a radius encoding a size of a variable type, wherein said glyph has a height dimension for encoding time increment.

13. A data visualization system comprising:

means for retrieving data representing different data items, said data items including one or more of functional, organizational and structural components relating to a software release; and means for organizing said data for display as a multi-dimensional glyph having one or more component objects, said component objects each being color-coded to represent a different one of a plurality of data items, each said component object having an attribute encoding changes in a value of its respective one of said data items over time.

14. An interactive data presentation system for use with a database containing software data related to one or more software releases over a period of time, said system comprising:

means for extracting various data items from said database and for representing said data items as display objects;

means for arranging said display objects as a visually recognizable glyph for presenting said data items simultaneously on a graphics display, said objects of said glyph being color coded to define a type of data and having attributes for presenting changes of said data items over time; and means for manipulating said glyph on said graphics display for presenting a state of said data items at a prior point in time.

15. An interactive data presentation system for use with a database, said system comprising:

means for extracting various data items from said database and for representing said data items as display objects;

means for arranging said display objects as a visually recognizable glyph for presenting said data items simultaneously on a graphics display, said objects of said glyph being color coded to define a type of data and having attributes for presenting changes of said data items over time;

means for manipulating said glyph on said graphics display for presenting a state of said data items at a prior point in time;

means for simultaneously displaying two or more glyphs on said display, said at least two glyphs displaying objects having like data items at different times, whereby a user can perceive data item trends over said times.

16. A method for generating data glyphs for presentation on a display, said method comprising the step of representing data items as objects for said display, where said display objects are arranged to form a visually recognizable glyph for presenting said data items simultaneously on said display, said objects of said glyph being color coded to define a type of data and having attributes for presenting changes of said data items over time, wherein said data items represent one or more of functional, organizational and structural components relating to a software release.

17. The method for generating data glyphs as claimed in claim 16, wherein said data items associated with each of said components change over time, each of the glyph objects including an attribute selected from the group consisting of a length attribute and a height attribute for presenting changing aspects of said data over time.

18. The method for generating data glyphs as claimed in claim 17, further including the step of superimposing two or more glyphs on said display so as to enable comparison of particular data items.

19. A method for generating data glyphs for presentation on a display, said method comprising the step of representing data items as objects for said display, where said display objects are arranged to form a visually recognizable glyph for presenting said data items simultaneously on said graphics display, said objects of said glyph being color coded to define a type of data and having attributes for presenting changes of said data items over time, wherein said objects of said glyph are color coded to define a type of software data.

20. A multi-dimensional glyph for visually presenting data comprising a plurality of component objects representing different data items, each component object having a color-coded attribute relating to one of said data items represented by said each component object, each color-coded attribute having a dimension for encoding data item changes over time, wherein said component objects have an appearance resembling an insect.

21. A multi-dimensional glyph for visually presenting data comprising a plurality of component objects representing different data items, each component object having a color-coded attribute relating to one of said data items represented by said each component object, each color-coded attribute having a dimension for encoding data item changes over time, wherein said component objects are formed in a substantially circular shape, each encoded data item formed as an individual time series having a common direction indicating time increment.

22. A multi-dimensional glyph for visually presenting data comprising a plurality of component objects formed in a substantially circular shape, said component objects representing different data items, each component object having a color-coded attribute relating to one of said data items represented by said each component object, each color-coded attribute having a dimension for encoding data item changes over time, each of said encoded data items resembling a slice of said substantially circular shape with a radius encoding a size of a variable data type, said glyph having a height dimension for encoding time increment.

23. A multi-dimensional glyph for visually presenting data comprising a plurality of component objects representing different data items, each component object having a color-coded attribute relating to one of said data items represented by said each component object, each color-coded attribute having a dimension for encoding data item changes over time, wherein said data items include one or more of functional, organizational and structural components relating to a software release.

* * * * *